US012593255B2

(12) United States Patent
Zhou et al.

(10) Patent No.: US 12,593,255 B2
(45) Date of Patent: Mar. 31, 2026

(54) TAG MAINTENANCE, UPDATE, AND SIGNALING

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 311 days.

(21) Appl. No.: 18/357,938

(22) Filed: Jul. 24, 2023

(65) Prior Publication Data

US 2024/0073760 A1    Feb. 29, 2024

Related U.S. Application Data

(60) Provisional application No. 63/373,442, filed on Aug. 24, 2022.

(51) Int. Cl.
*H04W 36/08*      (2009.01)
*H04W 36/00*      (2009.01)

(52) U.S. Cl.
CPC ....... *H04W 36/08* (2013.01); *H04W 36/0058* (2018.08); *H04W 36/0072* (2013.01)

(58) Field of Classification Search
None
See application file for complete search history.

(56) References Cited

U.S. PATENT DOCUMENTS

| | | | |
|---|---|---|---|
| 2019/0037458 A1* | 1/2019 | Kadiri | ................... H04W 76/20 |
| 2021/0195547 A1 | 6/2021 | Pezeshki et al. | |
| 2022/0078771 A1* | 3/2022 | Jang | ................. H04W 52/0219 |
| 2022/0248382 A1* | 8/2022 | Dinan | ................... H04W 72/23 |
| 2023/0217306 A1* | 7/2023 | Kim | ...................... H04W 28/06 |
| | | | 370/329 |

FOREIGN PATENT DOCUMENTS

WO        2022006502 A1      1/2022

OTHER PUBLICATIONS

International Search Report and Written Opinion—PCT/US2023/028619—ISA/EPO—Nov. 23, 2023.

(Continued)

*Primary Examiner* — Brian S Roberts
(74) *Attorney, Agent, or Firm* — QUALCOMM Incorporated

(57)            ABSTRACT

A method of wireless communication at a UE is disclosed herein. The method includes receiving a L1 mobility cell configuration or a L2 mobility cell configuration for a set of cell groups, where each cell group in the set of cell groups includes a plurality of cells, where a first cell group in the set of cell groups is associated with a pTAG and a second cell group in the set of cell groups is associated with a sTAG, where the pTAG is associated with a first TA and the sTAG is associated with a second TA. The method further includes receiving L1 signaling or L2 signaling that associates the second cell group with the pTAG and the first cell group with the sTAG.

30 Claims, 19 Drawing Sheets

(56) References Cited

OTHER PUBLICATIONS

Qualcomm Incorporated: "Discussion on L1/L2 Mobility", 3GPP TSG-RAN WG2 Meeting #113-bis-e, R2-2103079, 3rd Generation Partnership Project, Mobile Competence Centre, 650, Route Des Lucioles, F-06921 Sophia-Antipolis Cedex, France, vol. RAN WG2, No. Electronic, Apr. 12, 2021-Apr. 20, 2021, Apr. 2, 2021, XP052174591, pp. 1-6, Sections 2.2 and 2.3, p. 4.

Qualcomm Incorporated: "L1/L2 Mobility-General Concepts and Configuration", 3GPP TSG-RAN WG2 Meeting #119-e, R2-2207340, 3rd Generation Partnership Project, Mobile Competence Centre, 650, Route Des Lucioles, F-06921 Sophia-Antipolis Cedex, France, vol. RAN WG2, No. Electronic, Aug. 15, 2022-Aug. 26, 2022, Aug. 8, 2022, 6 Pages, XP052260662, p. 4, Figure 4, Sec 2, Par [02.5], Par [02.6], pp. 1-5, Sec 2.1, 2.4, Par 2.1, See sec 1 and 2.1-2.4, par [0105]- [0111], figure 7, Chapter 2. L1/L2 Inter-cell Mobility Schemes.

* cited by examiner

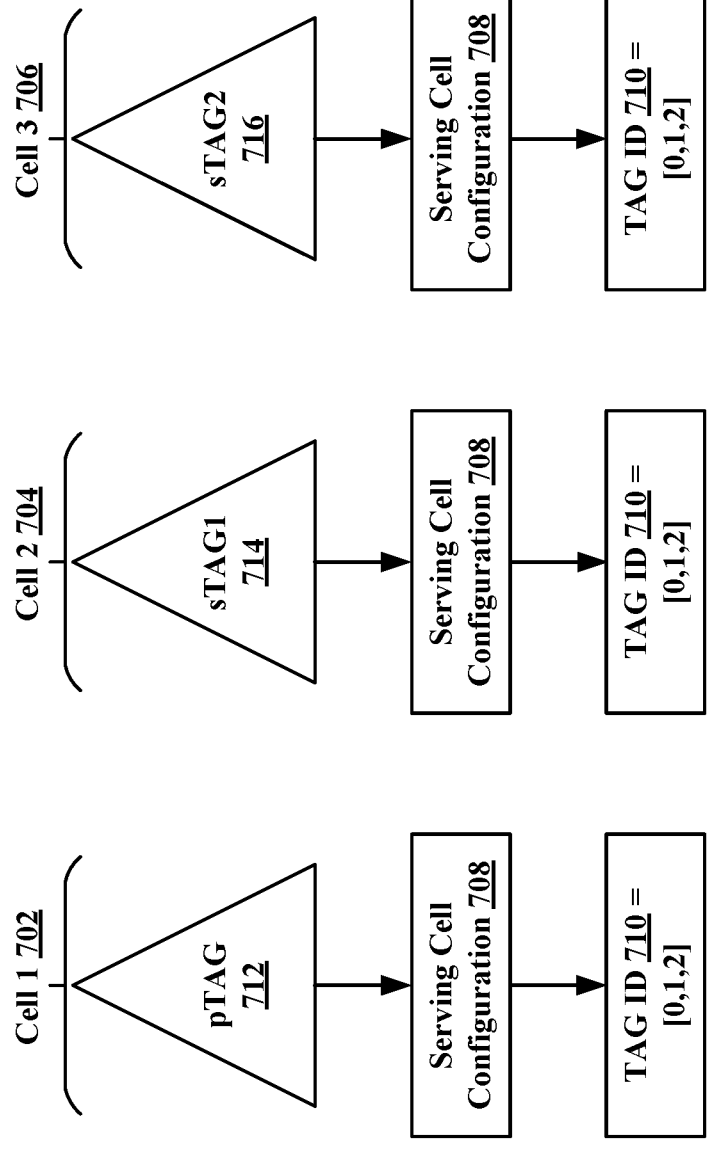
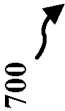
FIG. 7

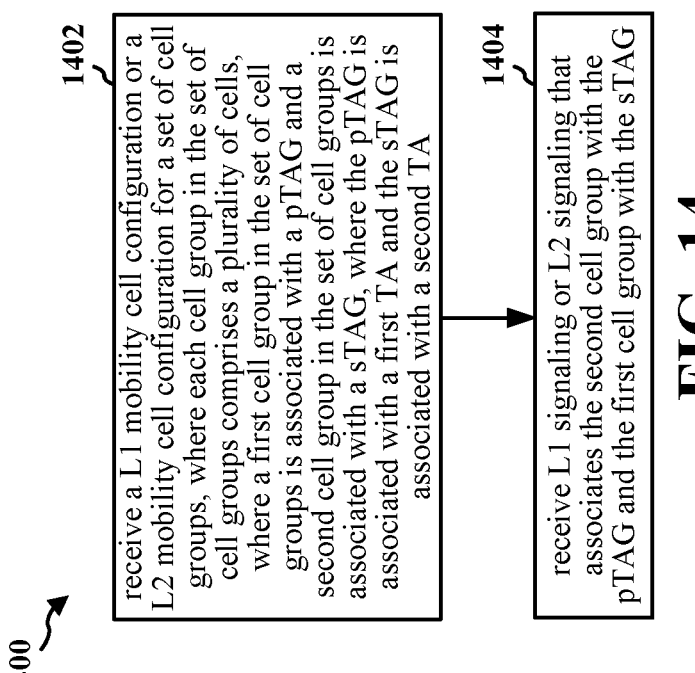

1400

1402 receive a L1 mobility cell configuration or a L2 mobility cell configuration for a set of cell groups, where each cell group in the set of cell groups comprises a plurality of cells, where a first cell group in the set of cell groups is associated with a pTAG and a second cell group in the set of cell groups is associated with a sTAG, where the pTAG is associated with a first TA and the sTAG is associated with a second TA

1404 receive L1 signaling or L2 signaling that associates the second cell group with the pTAG and the first cell group with the sTAG

FIG. 14

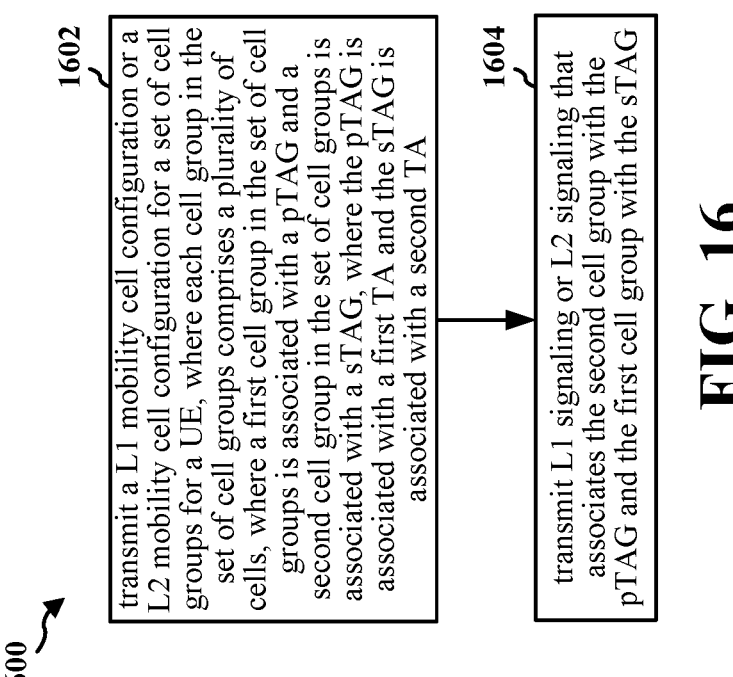

1600

1602 transmit a L1 mobility cell configuration or a L2 mobility cell configuration for a set of cell groups for a UE, where each cell group in the set of cell groups comprises a plurality of cells, where a first cell group in the set of cell groups is associated with a pTAG and a second cell group in the set of cell groups is associated with a sTAG, where the pTAG is associated with a first TA and the sTAG is associated with a second TA

1604 transmit L1 signaling or L2 signaling that associates the second cell group with the pTAG and the first cell group with the sTAG

FIG. 16

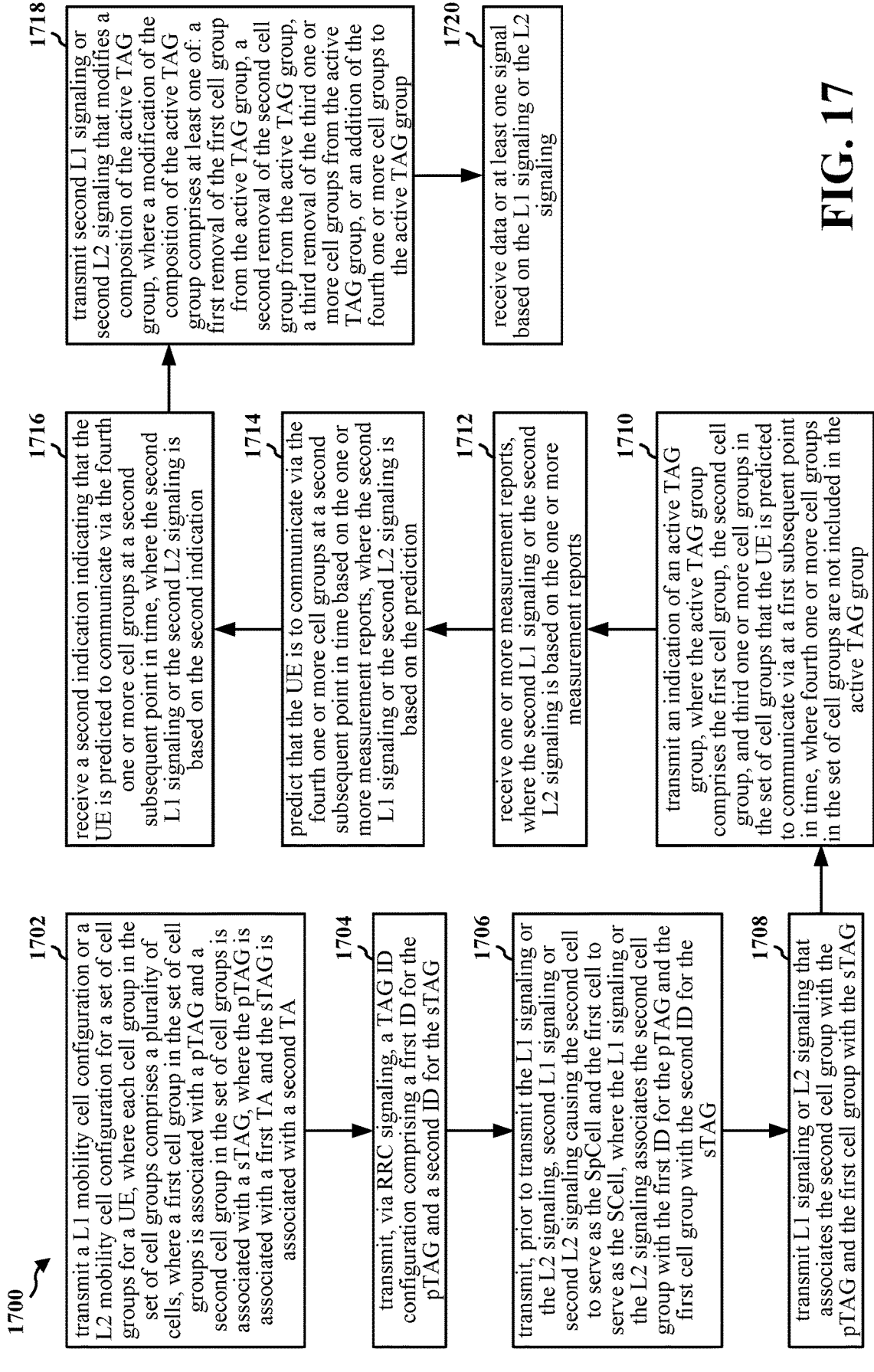

1702 — transmit a L1 mobility cell configuration or a L2 mobility cell configuration for a set of cell groups for a UE, where each cell group in the set of cell groups comprises a plurality of cells, where a first cell group in the set of cell groups is associated with a pTAG and a second cell group in the set of cell groups is associated with a sTAG, where the pTAG is associated with a first TA and the sTAG is associated with a second TA 1704 — transmit, via RRC signaling, a TAG ID configuration comprising a first ID for the pTAG and a second ID for the sTAG 1706 — transmit, prior to transmit the L1 signaling or the L2 signaling, second L1 signaling or second L2 signaling causing the second cell to serve as the SpCell and the first cell to serve as the SCell, where the L1 signaling or the L2 signaling associates the second cell group with the first ID for the pTAG and the first cell group with the second ID for the sTAG 1708 — transmit L1 signaling or L2 signaling that associates the second cell group with the pTAG and the first cell group with the sTAG 1710 — transmit an indication of an active TAG group, where the active TAG group comprises the first cell group, the second cell group, and third one or more cell groups in the set of cell groups that the UE is predicted to communicate via at a first subsequent point in time, where fourth one or more cell groups in the set of cell groups are not included in the active TAG group 1712 — receive one or more measurement reports, where the second L1 signaling or the second L2 signaling is based on the one or more measurement reports 1714 — predict that the UE is to communicate via the fourth one or more cell groups at a second subsequent point in time based on the one or more measurement reports, where the second L1 signaling or the second L2 signaling is based on the prediction 1716 — receive a second indication indicating that the UE is predicted to communicate via the fourth one or more cell groups at a second subsequent point in time, where the second L1 signaling or the second L2 signaling is based on the second indication 1718 — transmit second L1 signaling or second L2 signaling that modifies a composition of the active TAG group, where a modification of the composition of the active TAG group comprises at least one of: a first removal of the first cell group from the active TAG group, a second removal of the second cell group from the active TAG group, a third removal of the third one or more cell groups from the active TAG group, or an addition of the fourth one or more cell groups to the active TAG group 1720 — receive data or at least one signal based on the L1 signaling or the L2 signaling

TAG MAINTENANCE, UPDATE, AND SIGNALING

CROSS REFERENCE TO RELATED APPLICATION(S)

This application claims the benefit of and priority to U.S. Provisional Application Ser. No. 63/373,442, entitled "TAG MAINTENANCE, UPDATE, AND SIGNALING" and filed on Aug. 24, 2022, which is expressly incorporated by reference herein in its entirety.

TECHNICAL FIELD

The present disclosure relates generally to communication systems, and more particularly, to timing advance groups (TAGs).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communication at a user equipment (UE) are provided. The apparatus includes at least one memory and at least one processor coupled to the at least one memory and, based at least in part on information stored in the at least one memory, the at least one processor is configured to: receive a layer 1 (L1) mobility cell configuration or a layer 2 (L2) mobility cell configuration for a set of cell groups, where each cell group in the set of cell groups includes a plurality of cells, where a first cell group in the set of cell groups is associated with a primary timing advance group (pTAG) and a second cell group in the set of cell groups is associated with a secondary timing advance group (sTAG), where the pTAG is associated with a first timing advance (TA) and the sTAG is associated with a second TA; and receive L1 signaling or L2 signaling that associates the second cell group with the pTAG and the first cell group with the sTAG.

In an aspect of the disclosure, a method, a computer-readable medium, and an apparatus for wireless communication at a network entity are provided. The apparatus includes at least one memory and at least one processor coupled to the at least one memory and, based at least in part on information stored in the at least one memory, the at least one processor is configured to: transmit a layer 1 (L1) mobility cell configuration or a layer 2 (L2) mobility cell configuration for a set of cell groups for a user equipment (UE), where each cell group in the set of cell groups includes a plurality of cells, where a first cell group in the set of cell groups is associated with a primary timing advance group (pTAG) and a second cell group in the set of cell groups is associated with a secondary timing advance group (sTAG), where the pTAG is associated with a first timing advance (TA) and the sTAG is associated with a second TA; and transmit L1 signaling or L2 signaling that associates the second cell group with the pTAG and the first cell group with the sTAG.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 7 is a diagram illustrating example TAG identifiers (IDs) for different cells.

FIG. 14 is a flowchart of a method of wireless communication.

FIG. 16 is a flowchart of a method of wireless communication.

FIG. 17 is a flowchart of a method of wireless communication.

DETAILED DESCRIPTION

Figure 1:
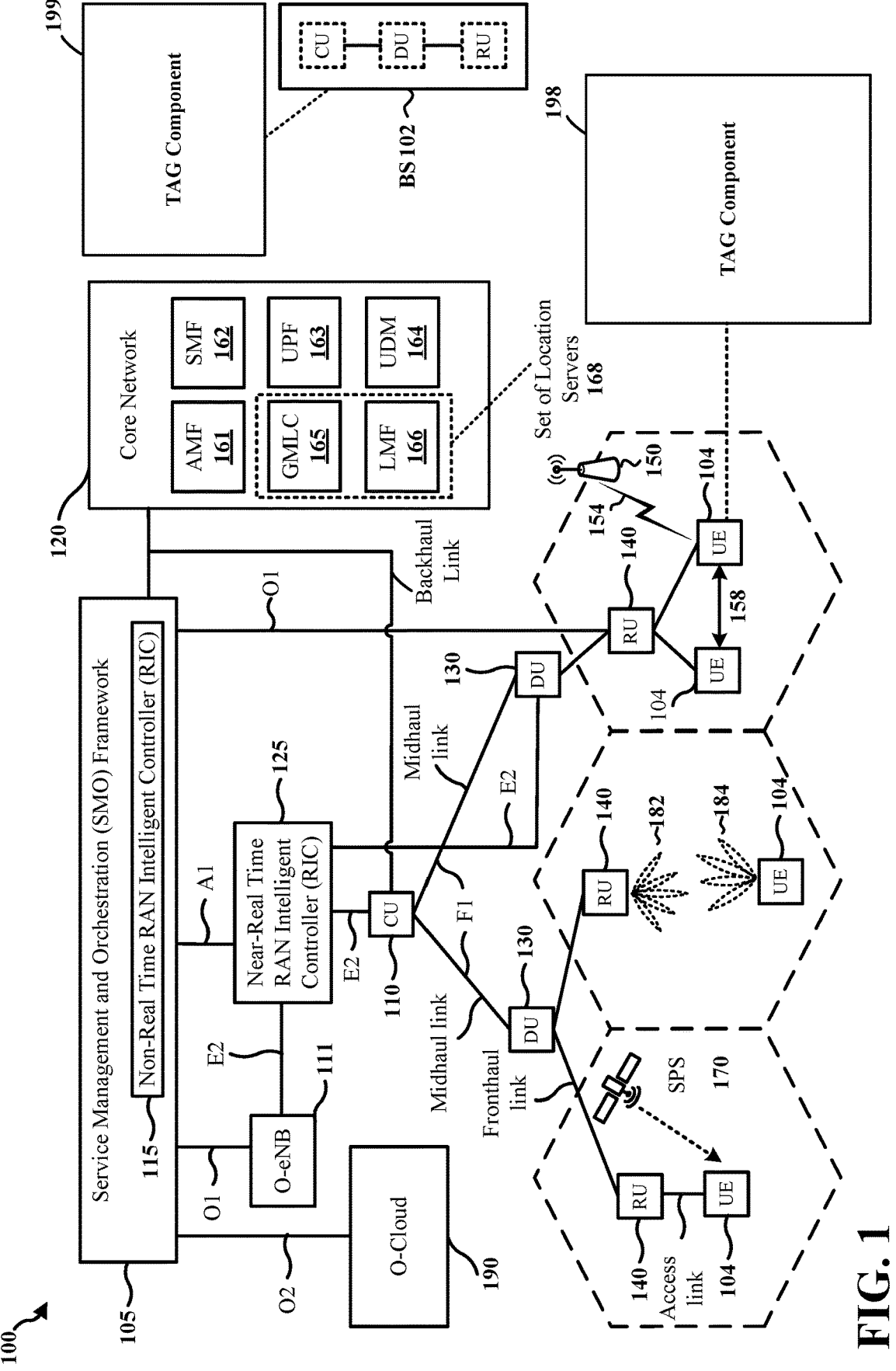
FIG. 1 is a diagram illustrating an example of a wireless communications system and an access network.

Cells may be configured for L1 or L2 mobility. Cells and/or cell groups within a L1/L2 mobility configured cell set may be associated with different TAGs, where a TAG may be associated with a timing advance (TA) that a UE may apply for communications via/with/over a cell belonging to the TAG. When an identity of a special cell (SpCell) changes within the L1/L2 mobility configured cell set and the new SpCell is not within the same TAG as the previous SpCell, a base station may change pTAG and sTAG associations, that is, the base station may transmit signaling which associates an ID for the pTAG with a cell group currently associated with the sTAG and which associates an ID for the sTAG with a cell group currently associated with the pTAG. A base station may change a TAG association of an SCell via RRC signaling. However, RRC signaling (i.e., layer 3 (L3) signaling) may be time consuming. Furthermore, a number of available TAG IDs may be limited and a number of cell groups in the L1/L2 mobility configured cell set may exceed the number of available TAG IDs. Various techniques for TAG maintenance, update, and signaling are disclosed herein. In an example, a UE receives a L1 mobility cell configuration or a L2 mobility cell configuration for a set of cell groups, where each cell group in the set of cell groups includes a plurality of cells, where a first cell group in the set of cell groups is associated with a pTAG and a second cell group in the set of cell groups is associated with a sTAG, where the pTAG is associated with a first TA and the sTAG is associated with a second TA. The UE receives L1 signaling or L2 signaling that associates the second cell group with the pTAG and the first cell group with the sTAG. The pTAG/sTAG associations may be updated for communications of the UE with cell(s) belonging to the pTAG/sTAGs based upon the L1 signaling or the L2 signaling without the UE receiving RRC signaling, which, as noted above, may be time consuming. Thus, the L1 signaling or the L2 signaling may be associated with increased communications reliability. Also disclosed herein are various techniques for managing TAG IDs when a number of cell groups exceeds a number of available TAG IDs.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS (e.g., a gNB), 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured with a TAG component 198 that is configured to receive a L1 mobility cell configuration or a L2 mobility cell configuration for a set of cell groups, where each cell group in the set of cell groups includes a plurality of cells, where a first cell group in the set of cell groups is associated with a pTAG and a second cell group in the set of cell groups is associated with a sTAG, where the pTAG is associated with a first TA and the sTAG is associated with a second TA and receive L1 signaling or L2 signaling that associates the second cell group with the pTAG and the first cell group with the sTAG. In certain aspects, the base station 102 may be configured with a TAG component 199 that is configured to transmit a L1 mobility cell configuration or a L2 mobility cell configuration for a set of cell groups for a UE, where each cell group in the set of cell groups includes a plurality of cells, where a first cell group in the set of cell groups is associated with a pTAG and a second cell group in the set of cell groups is associated with a sTAG, where the pTAG is associated with a first TA and the sTAG is associated with a second TA and transmit L1 signaling or L2 signaling that associates the second cell group with the pTAG and the first cell group with the sTAG. Although the following description may be focused on 5G NR, the concepts described herein may be applicable to other similar areas, such as LTE, LTE-A, CDMA, GSM, and other wireless technologies.

Figures 2A, 2B, 2C, 2D:
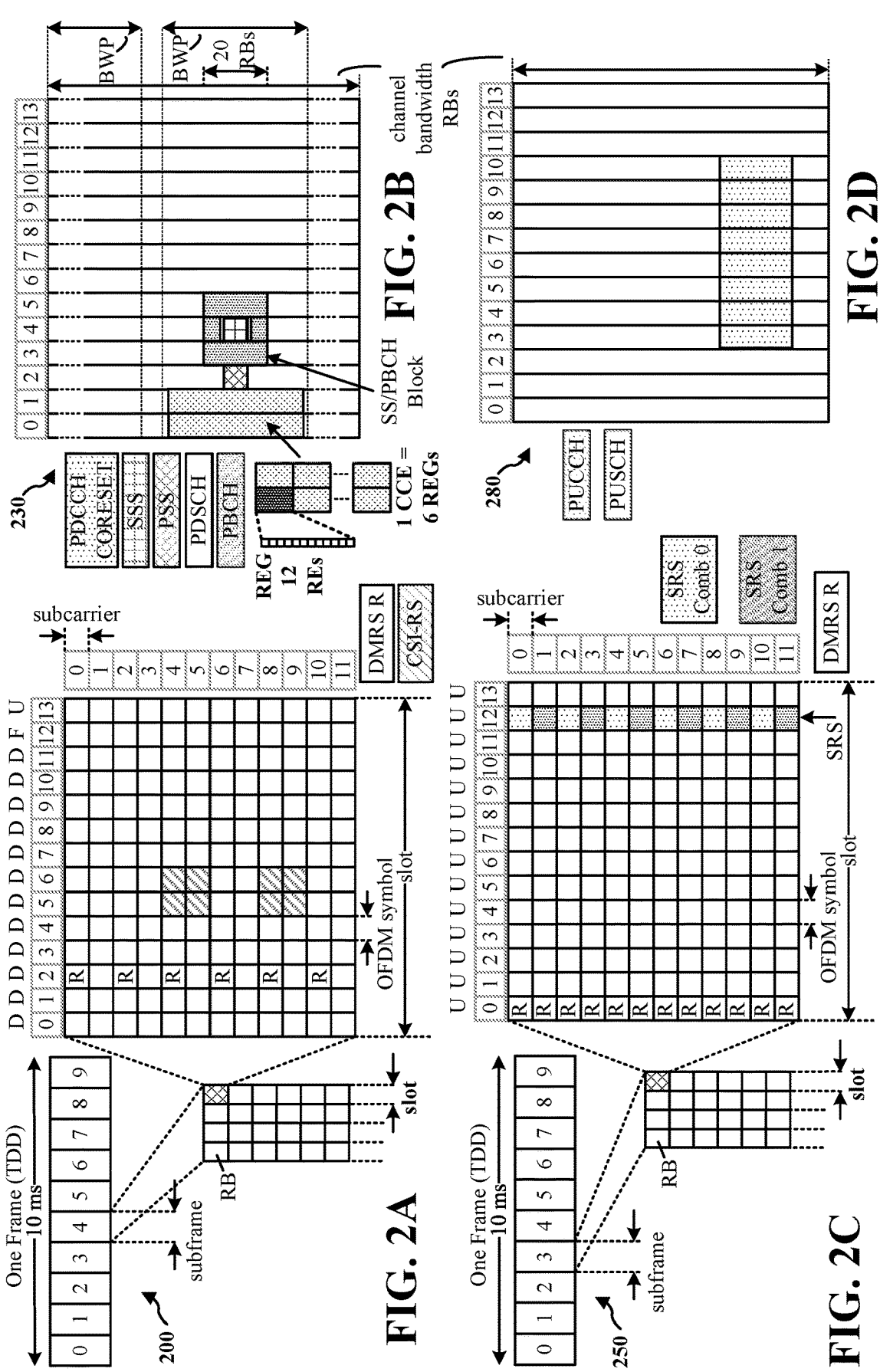
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| $\mu$ | SCS $\Delta f = 2^{\mu} \cdot 15[kHz]$ | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and 2 slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
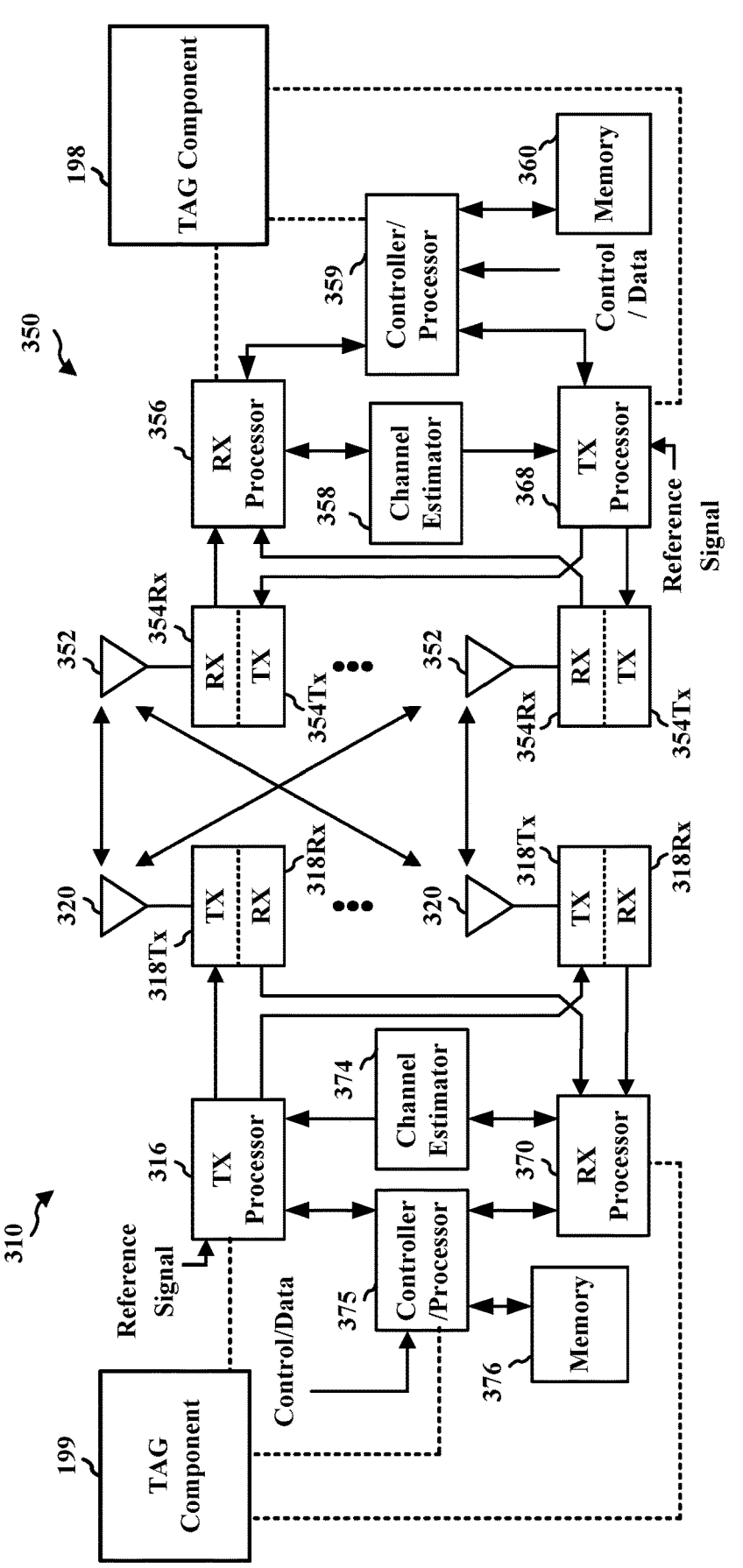
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the TAG component 198 of FIG. 1.

At least one of the TX processor 316, the RX processor 370, and the controller/processor 375 may be configured to perform aspects in connection with the TAG component 199 of FIG. 1.

Figure 4:
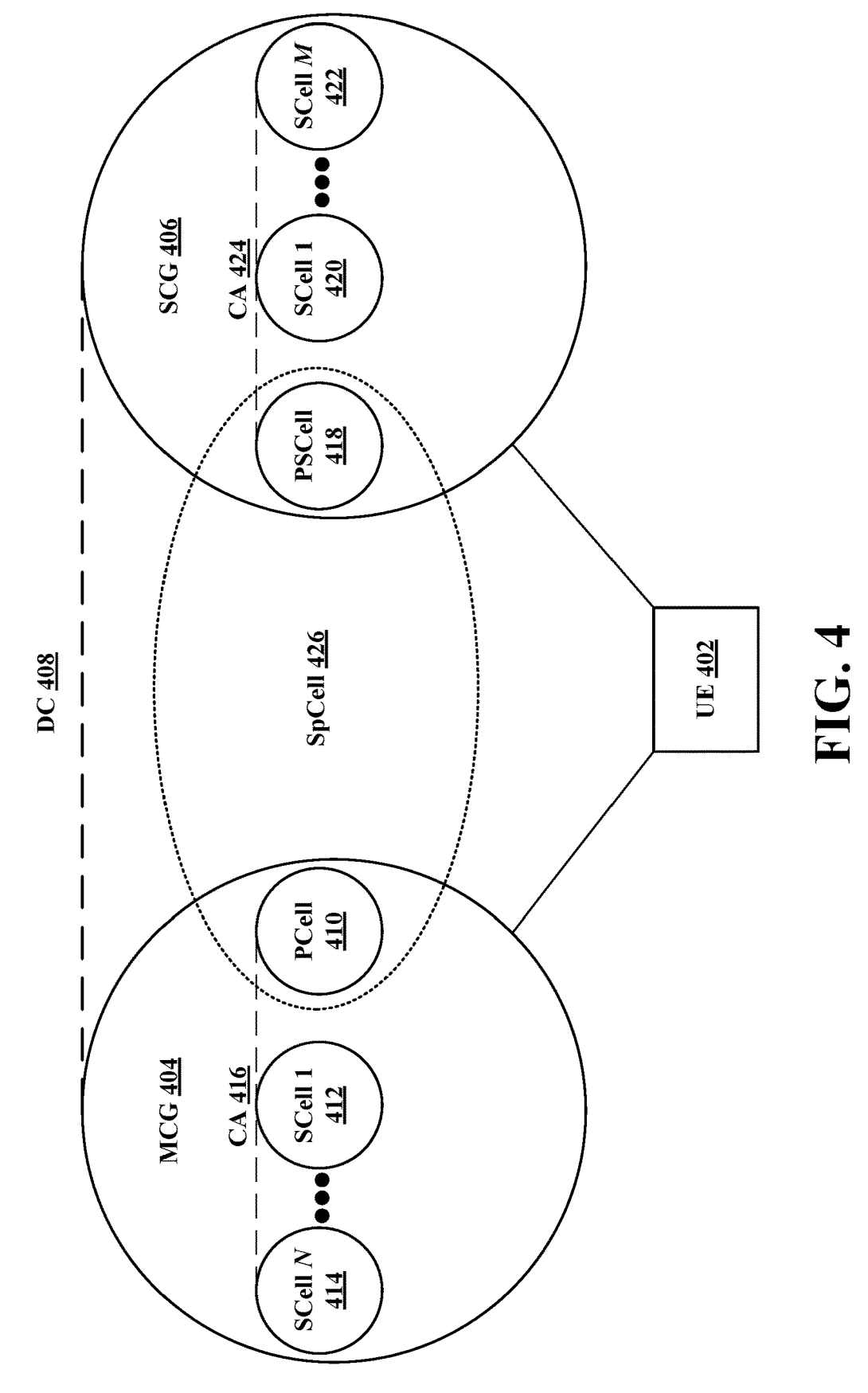
FIG. 4 is a diagram illustrating example cell designations.

FIG. 4 is a diagram 400 that illustrates an example of dual connectivity and carrier aggregation (CA). A UE 402 may be connected to a master cell group (MCG) 404 and a secondary cell group (SCG) 406. Such an arrangement may be referred to as dual connectivity (DC) 408. The MCG 404 may be a group of serving cells associated with a master node that has a control plane connection to a core network (e.g., the core network 120). The master node may be a base station such as a gNB, an eNB, etc. (i.e., a network entity). The SCG 406 may be a group of serving cells associated with a secondary node that does not have a control plane connection to the core network. The secondary node may be a base station, such as a gNB, an eNB, etc. (i.e., a network entity). The MCG 404 may become the SCG 406 and the SCG 406 may become the MCG 404 based upon various factors, such as a location of the UE 402, network conditions, etc.

The MCG 404 may include a PCell 410. The MCG 404 may also include one or more SCells (e.g., a first SCell 412 and an Nth SCell 414, where N is a positive integer greater than one). The PCell 410, the first SCell 412, and/or the Nth SCell 414 may be in a CA 416 configuration. In some aspects, a primary cell may become a secondary cell or that a secondary cell may become a primary cell based upon various factors, such as a location of the UE 402, network conditions, etc.

The SCG 406 includes a primary secondary cell (PSCell) 418. The PSCell 418 is a primary cell of the SCG 406. The SCG 406 may also include one or more SCells (e.g., a first SCell 420 and an Mth SCell 422, where M is a positive integer greater than one). The PSCell 418, the first SCell 420, and/or the Mth SCell 422 may be in a CA configuration 424. In some aspects, a primary secondary cell may become a secondary cell or that a secondary cell may become a primary secondary cell based upon various factors, such as a location of the UE 402, network conditions, etc.

The PCell 410 of the MCG 404 and the PSCell 418 of the SCG 406 may be referred to as a special cell (SpCell) 426. For a dual connectivity operation, the term SpCell refers to the PCell of the MCG or the PSCell of the SCG, e.g., depending on whether the MAC entity is associated to the MCG or the SCG, respectively. An SpCell supports PUCCH transmission and contention-based random access, and may be always activated. The SpCell 426 is responsible for data and control functionality. In cases in which there is no DC (e.g., when the MCG 404 is configured and when the SCG 406 is not configured), the PCell 410 may be referred to as the SpCell 426. A cell group that includes the SpCell 426 may be referred to as a PCG. It is to be understood that an SpCell may change based upon various factors, such as a location of the UE 402, network conditions, etc. In an example, a network entity may configure the first SCell 412 as a primary cell and Mth SCell 422 as a primary secondary cell to configure a new SpCell.

Figure 5:
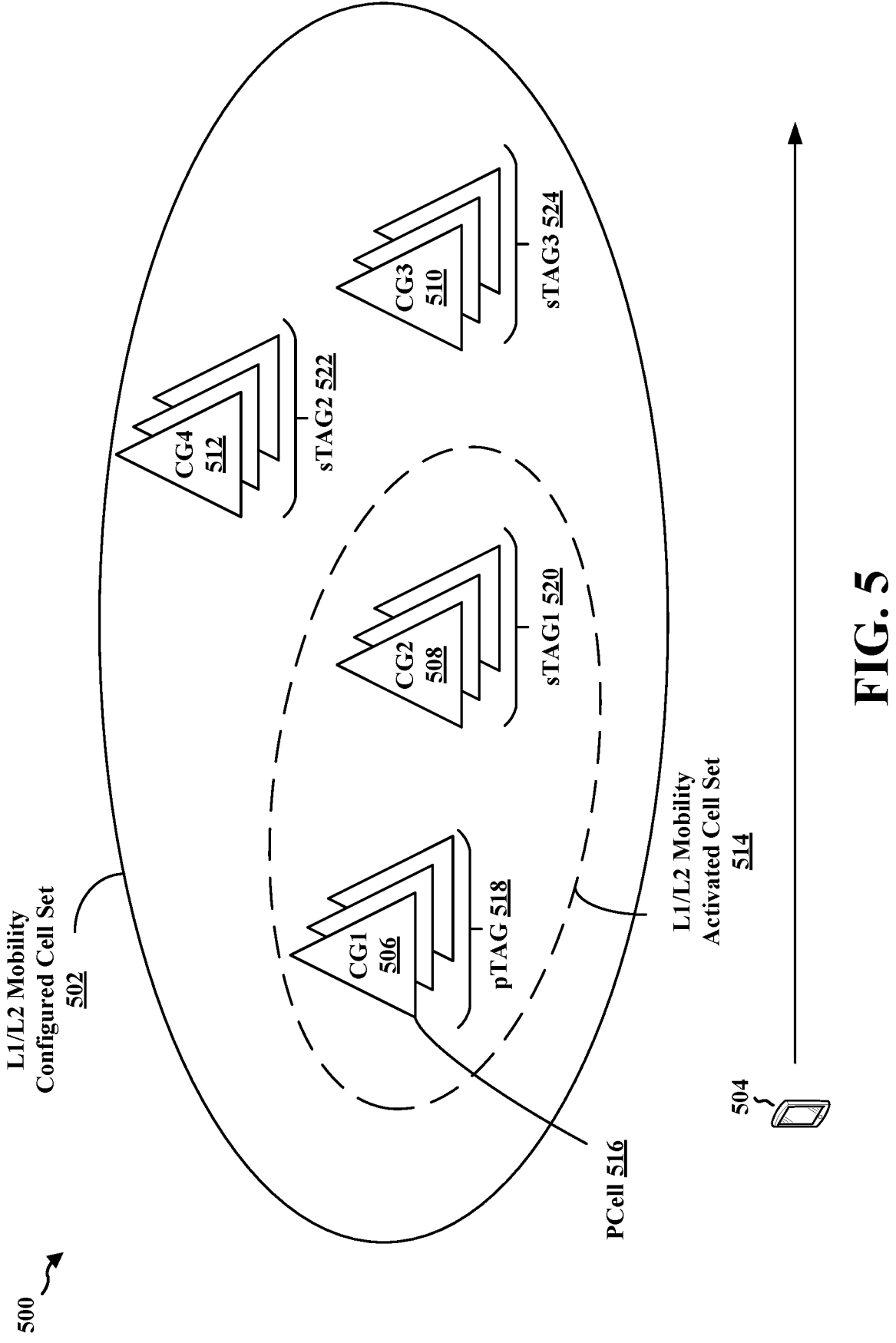
FIG. 5 is a diagram illustrating an example of cell groups belonging to timing advance groups (TAGs).
Figure 13:
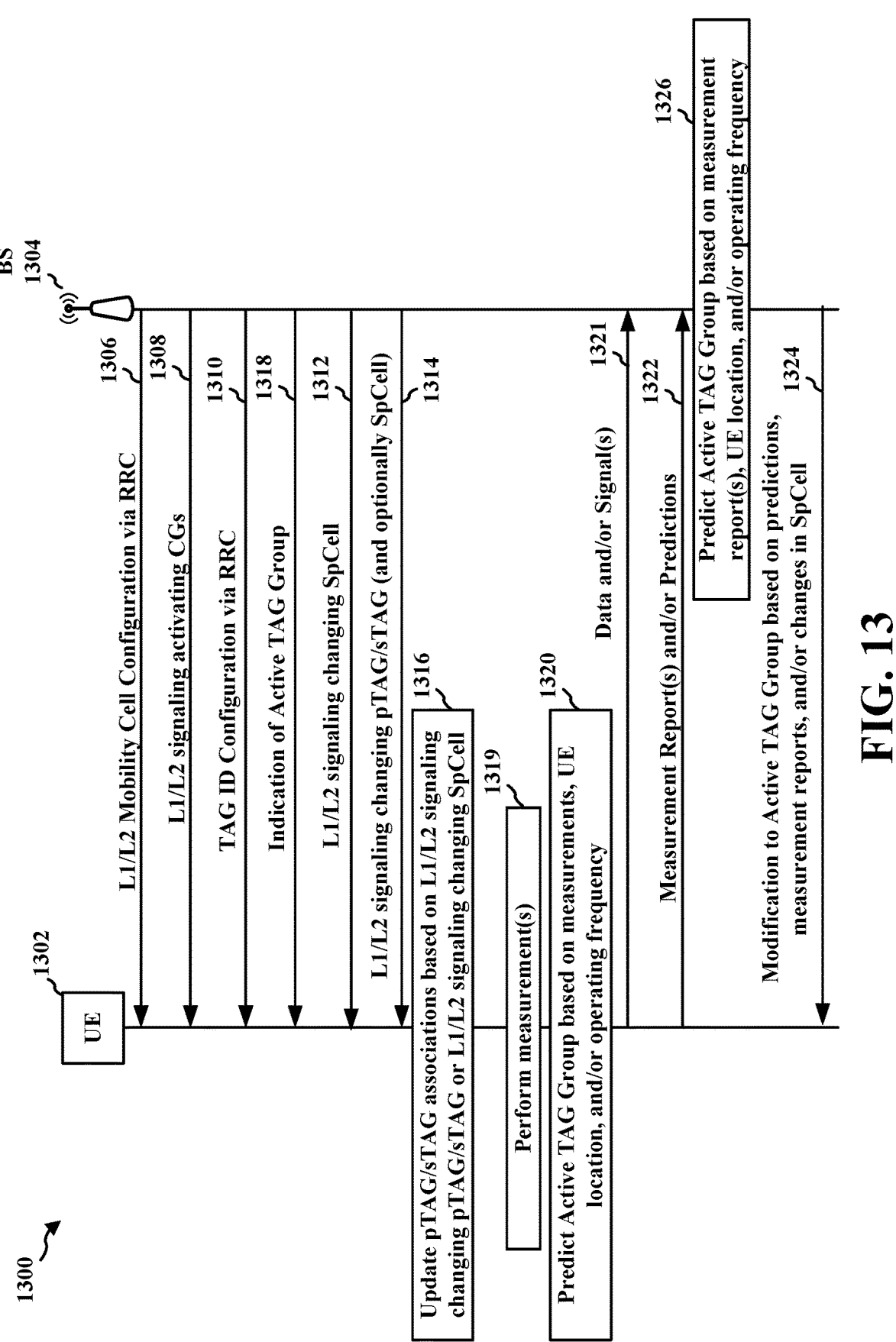
FIG. 13 is a diagram illustrating example communications between a UE and a base station.

FIG. 5 is a diagram 500 illustrating an example of cell groups belonging to TAGs. A TAG may also be referred to as a timing adjustment group. A base station may configure, via RRC, a L1/L2 mobility configured cell set 502 for a UE 504. FIG. 13 is a diagram 1300 that depicts example communications between a UE 1302 and a base station 1304. In an example, at 1306, the UE 1302 may receive a L1/L2 mobility cell configuration transmitted by the base station 1304. The L1/L2 mobility cell configuration may facilitate inter-cell mobility using L1 and/or L2 signaling. In an example, the L1/L2 mobility configured cell set 502 may include a first cell group (CG1) 506, a second cell group (CG2) 508, a third cell group (CG3) 510, and a fourth cell group (CG4) 512 (collectively "CGs 506-512"). Each of CGs 506-512 may include a plurality of cells (represented by triangles in the diagram 500).

The base station may transmit L1/L2 signaling that activates CGs for data and control transfer by the UE 504, that is, the L1/L2 signaling may place the CGs within a L1/L2 mobility activated cell set 514. L1 signaling may include DCI signaling. L2 signaling may include MAC-CE signaling. For example, referring to FIG. 13, at 1308, the UE 1302 may receive L1/L2 signaling that activates CGs within the L1/L2 mobility configured cell set 502. In an example, the base station transmits L1/L2 signaling that places CG1 506 and CG2 508 within the L1/L2 mobility activated cell set 514. CGs (e.g., CG3 510 and CG4 512) that are not within the L1/L2 mobility activated cell set 514 may be activated (so that such CGs may be used for data and control transfer) and added to the L1/L2 mobility activated cell set 514 via further L1/L2 signaling. Furthermore, CGs may be removed from the L1/L2 mobility activated cell set 514 via further L1/L2 signaling.

A UE may receive assignments of CGs to TAGs from a base station. For example, referring to FIG. 13 at 1310, the UE 1302 may receive a TAG identifier (ID) configuration via RRC, where the TAG ID configuration may associate CGs to different TAGs. Each TAG may have a unique ID. The base station may assign CGs to TAGs based upon band operation, existence of repeaters (repeaters may introduce extra delays in UL transmissions), a cell location, and/or a UE location. The base station may associate an SCell to a TAG when the SCell is added to the L1/L2 mobility configured cell set 502.

When a CG or cell is assigned to a TAG, the CG/cell may belong to the TAG. Cells in the L1/L2 mobility configured cell set 502 may belong to the same TAG or different TAGs. For example, a group of collocated component carriers (CCs) may belong to the same TAG. There may be multiple non-collocated CCs within the L1/L2 mobility configured cell set 502. Cells belonging to the same TAG may be associated with the same TA. When the UE 504 connects to a cell belonging to a TAG associated with a TA, the UE 504 may utilize the TA for communication via/with/over each cell belonging to the TAG.

A TA may refer to a negative offset at the UE 504 between a start of a DL slot as observed by the UE 504 and a start of an UL slot. The TA may account for propagation delays such that UL and DL transmission of the UE align at a reference point. In general, a first UE that is located relatively far from a base station may start an UL transmission relatively sooner than a second UE that is located relatively near the base station. As such, the first UE may apply a larger TA for UL transmissions than a TA applied by the second UE.

A TAG that includes a PCell (or an SpCell) may be designated as a pTAG. In an example, CG1 506 may include a cell that serves as the PCell 516. As such, CG1 506 may belong to a pTAG 518. A TAG that does not include the PCell (or the SpCell) may be designated as a sTAG. In an example, CG2 508 may belong to a first sTAG (sTAG1) 520, CG4 512 may belong to a second sTAG (sTAG2) 522, and CG3 510 may belong to a third sTAG (sTAG3) 524. In an example, pTAG 518, sTAG1 520, STAG2 522, and sTAG3 524 may be associated with different TAs.

When the UE 504 initially connects to CG1 506 that includes a cell serving as the PCell 516, the UE 504 may perform a RACH procedure with the PCell 516 to obtain a TA associated with pTAG 518. For SCells, the UE 504 may receive a PDCCH order from the base station. Upon receiving the PDCCH order, the UE may perform a contention-free RACH procedure on an SCell belonging to a sTAG (e.g., sTAG1 520, sTAG2 522, sTAG3 524, etc.) to obtain a TA associated with sTAG.

In a wireless communication system, a network may aim to ensure that a UE maintains connectivity with a network entity (e.g., a base station) as the UE moves within a network. L1/L2 based inter-cell mobility may help to reduce mobility latency. For instance, configuration and maintenance of multiple candidate cells may allow for rapid application of configurations for candidate cells. Furthermore, dynamic switching mechanisms among candidate serving cells (including an SpCell and SCell) based on L1/L2 signaling may further reduce latency.

L1/L2 based inter-cell mobility may be applicable to standalone operation scenarios, CA scenarios, and DC (e.g., NR-DC) scenarios. In the standalone operation scenarios and CA scenarios, L1/L2 based inter-cell mobility may be applicable for intra-DU cases and/or intra CU inter-DU cases. L1/L2 based inter-cell mobility may be applicable in both FR1 and FR2, as well as both in intra-frequency and inter-frequency. In L1/L2 based inter-cell mobility, source cells and target cells may be synchronized or non-synchronized.

When an identity of the SpCell changes within a L1/L2 mobility configured cell set and the new SpCell is not within the same TAG as the previous SpCell, a base station may change pTAG and sTAG associations, that is, the base station may transmit signaling which associates an ID for the pTAG with a cell group currently associated with the sTAG and which associates an ID for the sTAG with a cell group currently associated with the pTAG. A base station may change a TAG association of an SCell via RRC signaling. However, RRC signaling (i.e., layer 3 signaling) may be time consuming. Furthermore, a number of available TAG IDs may be limited and a number of cell groups in the L1/L2 mobility configured cell set may exceed the number of available TAG IDs. Various techniques for TAG maintenance, update, and signaling are disclosed herein. In an example, a UE receives a L1 mobility cell configuration or a L2 mobility cell configuration for a set of cell groups, where each cell group in the set of cell groups includes a plurality of cells, where a first cell group in the set of cell groups is associated with a pTAG and a second cell group in the set of cell groups is associated with a sTAG, where the pTAG is associated with a first timing TA and the sTAG is associated with a second TA. The UE receives L1 signaling or L2 signaling that associates the second cell group with the pTAG and the first cell group with the sTAG. The pTAG/sTAG associations may be updated for communications of the UE with cell(s) belonging to the pTAG/sTAGs based upon the L1 signaling or the L2 signaling without the UE receiving RRC signaling, which, as noted above, may be time consuming. Thus, the L1 signaling or the L2 signaling may be associated with increased communications reliability. Also disclosed herein are various techniques for managing TAG IDs when a number of cell groups exceeds a number of available TAG IDs.

Figure 6:
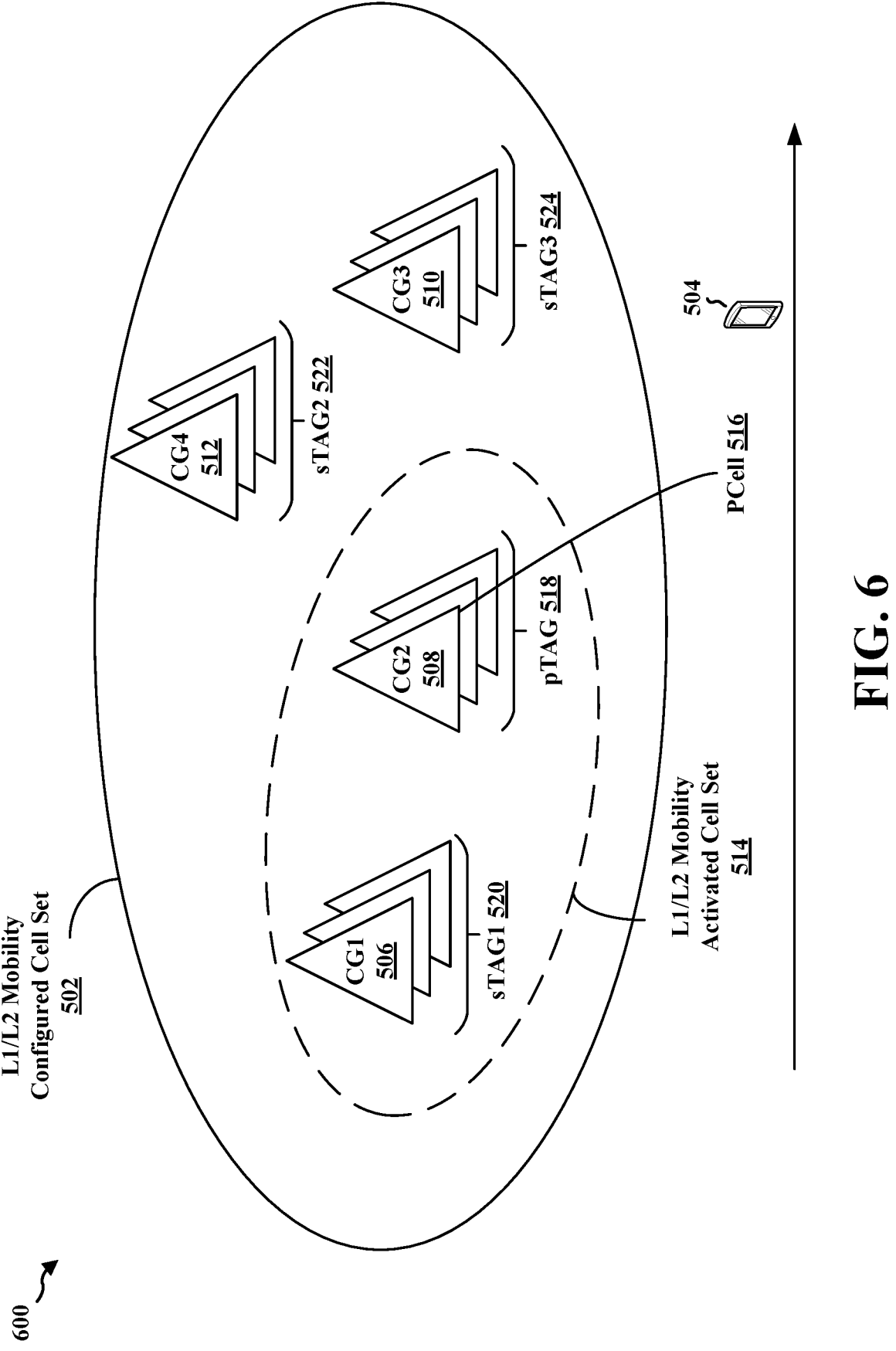
FIG. 6 is a diagram illustrating an example of cell groups belonging to TAGs.

FIG. 6 is a diagram 600 illustrating an example of cell groups belonging to TAGs. In the example depicted in the diagram 600, the UE 504 has moved from a first location to a second location (in comparison to the diagram 500). A base station may transmit L1/L2 signaling to the UE 504 that changes an identity of the PCell 516 (or an SpCell) within the L1/L2 mobility configured cell set 502. For instance, in the diagram 600 and in contrast to the diagram 500, a cell within CG2 508 is now the PCell 516. For example, referring to FIG. 13, at 1312, the UE 1302 may receive L1/L2 signaling transmitted by the base station 1304, where the L1/L2 signaling changes an identity of the SpCell.

As the identity of the PCell 516 (or the SpCell) has changed and the new cell (a cell in CG2 508) serving as the PCell 516 belongs to a different TAG than the previous cell (a cell in CG1 506) serving as the PCell 516, the base station may switch pTAG 518 and sTAG1 520 associations. Stated differently, a pTAG reference update may be utilized for deactivated sTAGs. As depicted in the diagram 600, the base station may transmit L1/L2 signaling to the UE 504 that associates pTAG 518 with CG2 508 and sTAG1 520 with CG1 506. A pTAG/sTAG association update may be based on a configured set of TAG IDs for each cell (or cell group) within the L1/L2 mobility configured cell set 502. A pTAG association update (which may be referred to as a designation update) may be implicit and based on an SpCell designation update.

In an example, the base station may assign CGs 506-512 with unique TAG IDs corresponding to their respective TAGs. When an association of pTAG 518 changes (e.g., from being associated with CG1 506 to being associated with CG2 508), the base station may swap the unique TAG IDs. For instance, the base station may swap a TAG ID of "0" associated with CG1 506 to CG2 508 and the base station may swap a TAG ID of "1" associated with CG2 508 to CG1 506.

For example, referring to FIG. 13, at 1314, the UE 1302 may receive L1/L2 signaling transmitted by the base station 1304 that changes pTAG/sTAG associations. At 1316, the UE may update pTAG/sTAG associations based upon the L1/L2 signaling received at 1314. A base station that transmits L1/L2 signaling for changing pTAG/sTAG associations may change the pTAG/sTAG associations faster in comparison to a base station that utilizes RRC signaling to change the pTAG/sTAG associations.

FIG. 7 is a diagram 700 illustrating example TAG identifiers (IDs) for different cells. The diagram 700 depicts a first cell 702, a second cell 704, and a third cell 706 (collectively "the cells 702-706"). In an example, the first cell 702 may belong to CG1 506, the second cell 704 may belong to CG2 508, and the third cell 706 may belong to CG4 512. As part of an initial configuration, a UE (e.g., the UE 504) may receive a serving cell configuration 708 that associates each of the cells 702-706 with a set of TAG IDs 710. The set of TAG IDs 710 may include "0," "1," and "2." The serving cell configuration 708 may also associate each of the cells 702-706 with a TAG ID in the set of TAG IDs 710. In an example, the serving cell configuration 708 may associate the first cell 702 with "0" in the set of TAG IDs 710, that is, the first cell 702 may be associated with (i.e., be assigned to, belong to) a pTAG 712. The serving cell configuration 708 may associate the second cell 704 with "1" in the set of TAG IDs 710, that is, the second cell 704 may be associated with (i.e., be assigned to, belong to) a sTAG1 714. The serving cell configuration 708 may associate the third cell 706 with "2" in the set of TAG IDs 710, that is, the third cell 706 may be associated with (i.e., be assigned to, belong to) a sTAG2 716. Cells that belong to the same TAG may be assigned the same TAG ID at the same time. Each of the set of TAG IDs 710 may be associated with the same or a different TA.

In one aspect, the serving cell configuration 708 may adhere to the following format:

```
ServingCellConfig::=        Sequence {
    ...
    tag-ID                  SEQUENCE (SIZE (1..maxNrofTAGs)) of
                            TAG-ID
    ...
}
```

Figure 8:
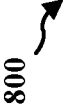
FIG. 8 is a diagram illustrating an example of changing TAG IDs for different cells.

FIG. 8 is a diagram 800 illustrating an example of changing TAG IDs for different cells. As described above in the description of the diagram 700, the diagram 800 includes the first cell 702 that belongs to pTAG 712, the second cell 704 that belongs to sTAG1 714, and the third cell 706 that belongs to sTAG2 716. Stated differently, the serving cell configuration 708 described in the description of the diagram 700 may associate the first cell 702 with tag ID "0," the second cell 704 with the tag ID "1," and the third cell 706 with the tag ID "2."

A base station may transmit L1/L2 signaling 802 (e.g., a DCI or a MAC-CE) to a UE (e.g., the UE 504) that changes TAG associations of the cells 702-706. The L1/L2 signaling 802 may be utilized to select TAG IDs to use when a new cell serving as the SpCell belongs to a different TAG than a previous cell serving as the SpCell. For instance, the L1/L2 signaling 802 may associate the first cell 702 with sTAG1 714 and the second cell 704 with pTAG 712. For example, referring to FIG. 13, at 1314, the UE 1302 may receive L1/L2 signaling transmitted by the base station 1304 that changes pTAG/sTAG associations, that is, the L1/L2 signaling may associate cells or cell groups with different TAG IDs. At 1316, the UE 1302 may update the pTAG/sTAG associations based upon the L1/L2 signaling received at 1314.

In one aspect, the L1/L2 signaling 802 may be explicit L1/L2 signaling. For instance, the L1/L2 signaling 802 may include TAG IDs for the UE to apply when the pTAG changes. In an example, the L1/L2 signaling 802 may include an identifier for the first cell 702 and an indication that the TAG ID "1" is to be associated with the first cell 702 an identifier for the second cell 704 (i.e., the new SpCell) and an indication that the TAG ID "0" is to be associated with the second cell 704. When the UE communicates via/with/over the first cell 702, the UE may apply a first TA associated with sTAG1 based upon the TAG ID "1." When the UE communicates via/with/over the second cell 704, the UE may apply a second TA associated with the pTAG based upon the TAG ID "0."

In one aspect in which the L1/L2 signaling 802 is explicit, the L1/L2 signaling 802 may be dedicated L1/L2 signaling. For example, the UE may receive L1/L2 signaling that changes the identity of the SpCell (or PCell) and the UE may separately receive the L1/L2 signaling 802 that changes pTAG/sTAG associations. For example, referring to FIG. 13, at 1312, the UE 1302 may receive (first) L1/L2 signaling that changes an identity of the SpCell. At 1314, the UE 1302 may receive (second) L1/L2 signaling that changes the pTAG/sTAG associations.

In one aspect in which the L1/L2 signaling 802 is explicit, the L1/L2 signaling 802 may be joint L1/L2 signaling. For example, the L1/L2 signaling 802 may change (1) the identity of the SpCell (or PCell) and (2) the pTAG/sTAG associations. For example, referring to FIG. 13, at 1314, the UE 1302 may receive L1/L2 signaling that changes an identity of the SpCell and that changes the pTAG/sTAG associations.

In one aspect, the L1/L2 signaling 802 may be implicit L1/L2 signaling. For instance, the L1/L2 signaling 802 may change the identity of the SpCell (or PCell). The L1/L2 signaling 802 may not include TAG IDs. When the UE receives the L1/L2 signaling 802, the UE may autonomously swap TAG IDs (e.g., swap the TAG ID "0" with the TAG ID "1" for the first cell 702 and swap the TAG ID "1" with the TAG ID "0" for the second cell 704) if the cell that is to serve as the new SpCell belongs to a different TAG than a cell that services as the current SpCell. For example, referring to FIG. 13 at 1312, the L1/L2 signaling that changes the SpCell may implicitly change pTAG/sTAG associations at 1316. A base station may update TAG ID associations as well.

Figure 9:
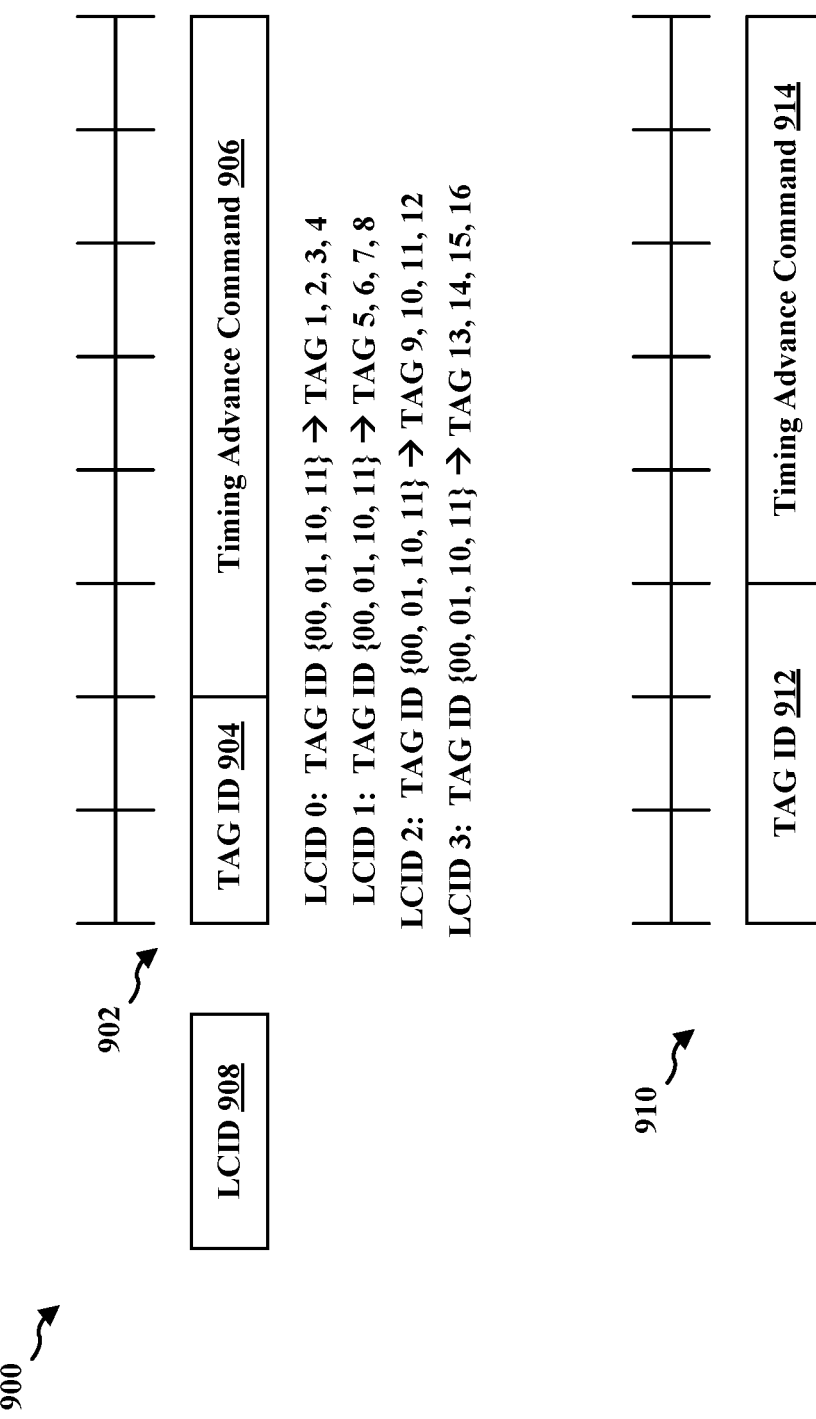
FIG. 9 is a diagram illustrating example medium access control (MAC) control elements (MAC-CEs) for changing TAG IDs.

FIG. 9 is a diagram 900 illustrating example MAC-CEs for changing TAG IDs. In some aspects, a number of CGs in the L1/L2 mobility configured cell set 502 may be greater than a number of available TAG IDs configured by the serving cell configuration 708. In an example, the number of available TAG IDs may be four. A UE may receive a configuration via RRC signaling that increases the number of available TAG IDs. In an example, the configuration may increase the number of available TAG IDs from four to sixteen. For example, referring to FIG. 13, at 1310, the UE 1302 may receive a TAG ID configuration via RRC signaling that increases the number of available TAG IDs.

In one aspect, the L1/L2 signaling may include a MAC-CE 902. The MAC-CE 902 may include a TAG ID 904 and a timing advance command 906. The TAG ID 904 may be two bits wide. To accommodate a number of TAG IDs greater than four (e.g., sixteen), the MAC-CE 902 may be associated with a logical channel index (LCID) 908. A combination of the LCID 908 and the TAG ID 904 may indicate a TAG. In an example, LCID "0" may be associated with TAGs 0-4, LCID "1" may be associated with TAGs 5-8, LCID "2" may be associated with TAGs 9-12, and LCID "3" may be associated with TAGs 13-15. Bits in the TAG ID 904 may be utilized to sub-select a specific TAG. In an example, when the LCID 908 is "1" and the TAG ID 904 is "10," the MAC-CE 902 may indicate TAG 7. In an example, referring to FIG. 13, at 1314, the L1/L2 signaling received by the UE 1302 may include the MAC-CE 902 and the LCID 908.

In one aspect, the L1/L2 signaling may include a MAC-CE 910. The MAC-CE 910 may include a TAG ID 912 and a timing advance command 914. The TAG ID 912 may be four bits wide to accommodate sixteen available TAG IDs. In an example, referring to FIG. 13, at 1314, the L1/L2 signaling received by the UE 1302 may include the MAC-CE 910.

Figure 10:
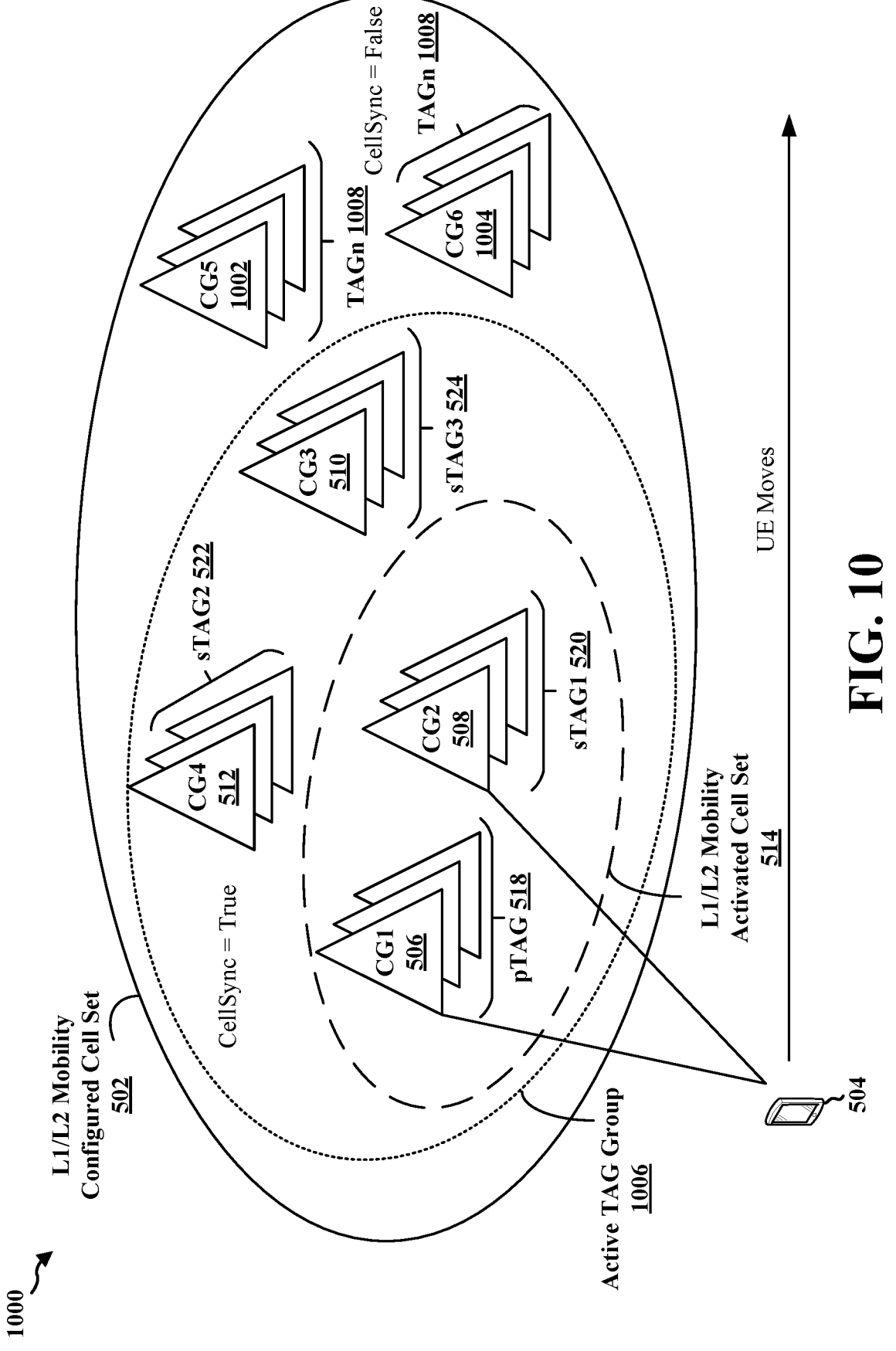
FIG. 10 is a diagram illustrating an example of cell groups belonging to TAGs and an active TAG group.

FIG. 10 is a diagram 1000 illustrating an example of cell groups belonging to TAGs and an active TAG group. The active TAG group may refer to a group of cells for which a TAG ID associated with each cell is active and valid. As noted above, a number of CGs in the L1/L2 mobility configured cell set 502 may be greater than a number of available TAG IDs configured by the serving cell configuration 708. In the example depicted in the diagram 1000, four TAG IDs may be available and six CGs (CG1 506, CG2 508, CG3 510, CG4 512, a fifth cell group (CG5) 1002, and a sixth cell group (CG6) 1004) are within the L1/L2 mobility configured cell set 502.

In one aspect, a base station may define an active TAG group 1006. The active TAG group may include CGs that the UE 504 is currently communicating via/with/over and CGs that the UE 504 is predicted to communicate via/with/over in the future. In the diagram 1000, the active TAG group 1006 includes CG1 506 and CG2 508 (CGs that the UE 504 is currently communicating via/with/over) as well as CG3 510 and CG4 512 (CGs that the UE 504 is predicted to communicate via/with/over in the future). Predictions as to which CGs the UE 504 is predicted to communicate via/with/over in the future may be based upon a location of the UE 504, measurement report(s) transmitted by the UE 504, and/or frequency bands associated with the CGs. Predictions may be made by the UE 504 or the base station.

CGs within the active TAG group 1006 may be synchronized with the UE 504. CGs that are not within the active CG (e.g., CG5 1002 and CG6 1004) may not be synchronized with the UE 504. For instance, the CGs within the active TAG group 1006 may be assigned a Boolean information element "CellSync=True" and the CGs not within the active TAG group 1006 may be assigned the Boolean information "CellSync=False." As CG5 1002 and CG6 1004 are not synchronized with the UE 504 (i.e., "CellSync=False"), the UE 504 may ignore a TAGn 1008 associated with CG5 1002 and CG6 1004.

For example, referring to FIG. 13 at 1318, the UE 1302 may receive an indication of an active TAG group transmitted by the base station 1304. The UE 1302 may ignore TAG of CGs within the L1/L2 mobility configured cell set 502 that are not within the active TAG group.

Figure 11:
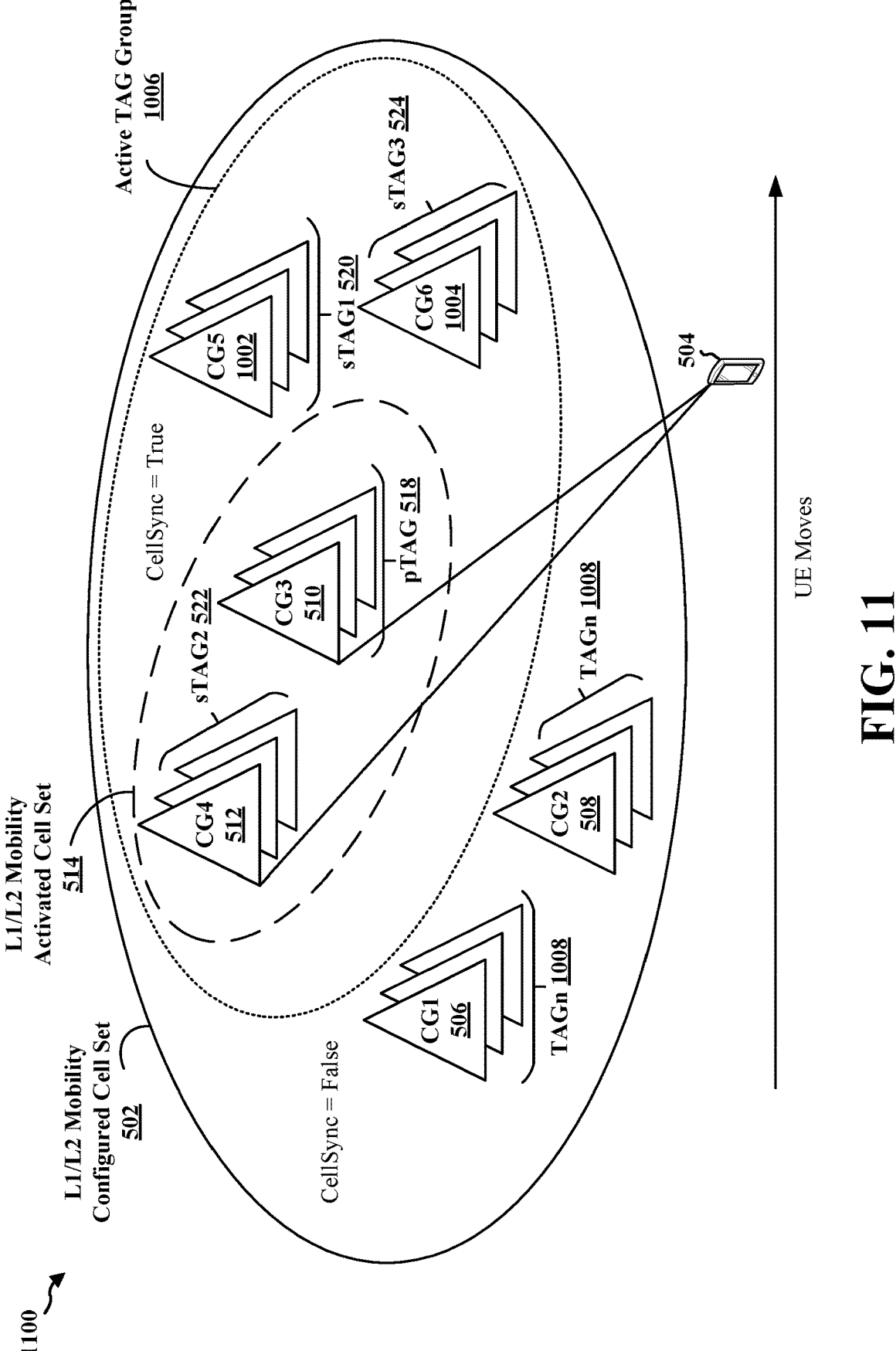
FIG. 11 is a diagram illustrating an example of cell groups belonging to TAGs and an active TAG group.

FIG. 11 is a diagram 1100 illustrating an example of cell groups belonging to TAGs and an active TAG group. In the diagram 1100, the UE 504 has moved from a first location (depicted in the diagram 1000) to a second location. As a result, the base station may transmit L1/L2 signaling that changes pTAG/sTAG associations. As depicted in the diagram 1000, the UE 504 has received L1/L2 signaling that associates pTAG 518 with CG3 510, sTAG1 520 with CG5, and sTAG3 524 with CG6 1004. Furthermore, composition of the active TAG group 1006 may change.

In an example, referring to FIG. 13, at 1319, the UE 1302 may perform a measurement (or measurements) on DL-RSs associated with CGs (e.g., CG5 1002, CG6 1004, etc.). In one aspect, at 1320, the UE may predict changes to the active TAG group 1006 based upon the measurement(s), the location of the UE 504, and/or an operating frequency associated with the CGs. The measurement(s) may be reference signal received power (RSRP) measurements. At 1322, the UE 1302 may transmit a measurement report (or measurement reports) that include the measurement(s) and/or predictions. At 1324, the UE 1302 may receive, via L1/L2 signaling, a modification to the active TAG group 1006 based on predictions and/or changes in the SpCell.

In another aspect, referring to FIG. 13, at 1319, the UE 1302 may perform a measurement (or measurements) on DL-RSs associated with CGs (e.g., CG5 512, CG5 1002, etc.). At 1322, the UE 1302 may transmit a measurement report (or measurement reports) that include the measurement(s). At 1326, the base station 1304 may predict changes to the active TAG group 1006 based upon the measurement (s), the location of the UE 504, and/or an operating frequency associated with the CGs. At 1324, the UE 1302 may receive, via L1/L2 signaling, a modification to the active TAG group 1006 based on predictions and/or changes in the SpCell.

In an example, the L1/L2 signaling removes CG1 506 and CG2 508 from the active TAG group 1006 and adds CG5 1002 and CG6 1004 to the active TAG group 1006. As the CG1 506 and CG2 508 are no longer within the active TAG group 1006, CG1 506 and CG2 508 have "CellSync=False." CG1 506 and CG2 508 are no longer synchronized with the UE 504 and the UE 504 may ignore the TAGn 1008 now associated with CG1 506 and CG2 508.

Figure 12:
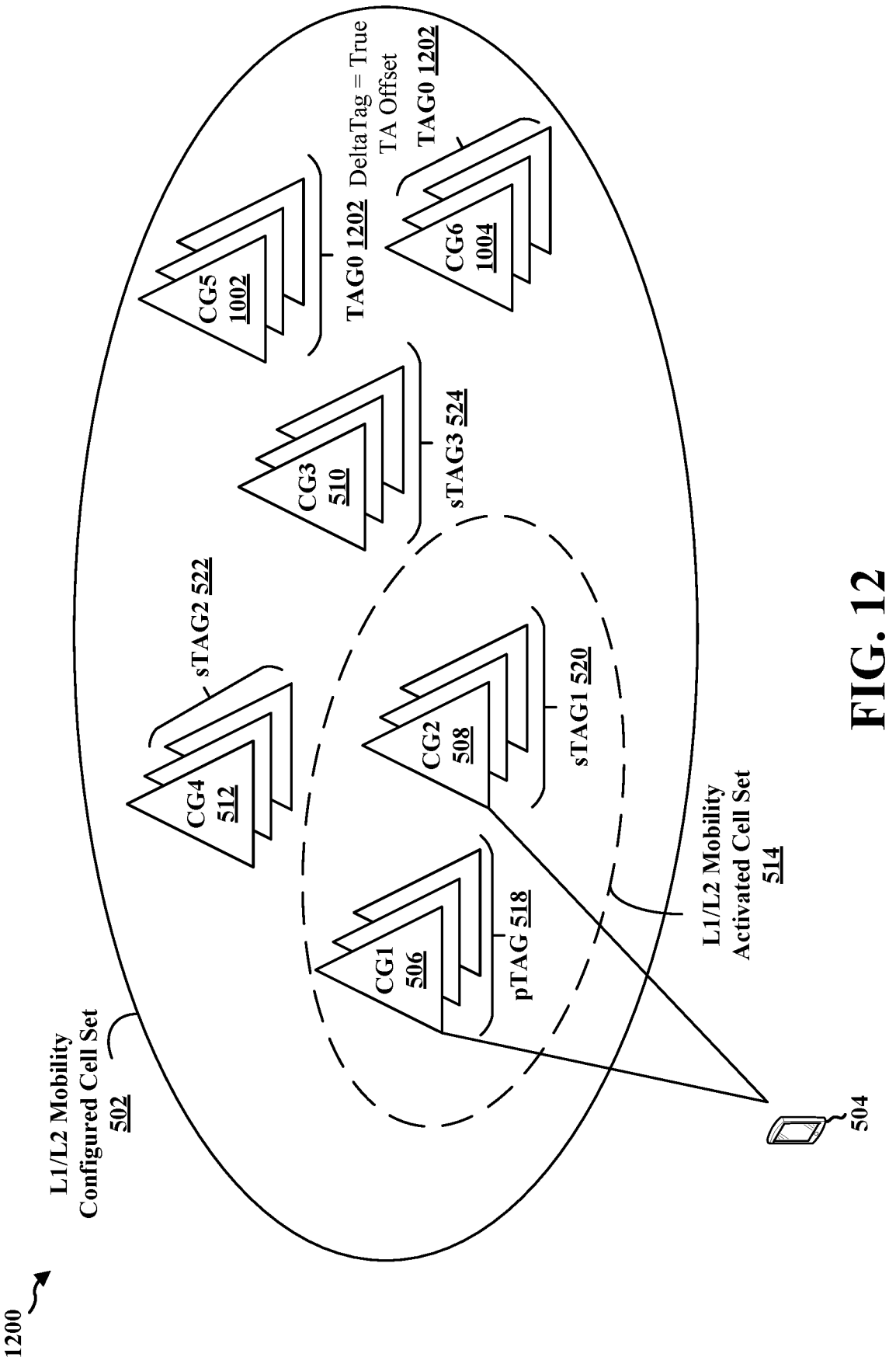
FIG. 12 is a diagram illustrating cell groups configured with a delta TAG.

FIG. 12 is a diagram 1200 illustrating cell groups configured with a delta TAG. As noted above, a number of CGs in the L1/L2 mobility configured cell set 502 may be greater than a number of available TAG IDs configured by the serving cell configuration 708. In the example depicted in the diagram 1000, four TAG IDs may be available and six CGs (CG1 506, CG2 508, CG3 510, CG4 512, CG5 1002, and CG6 1004) are within the L1/L2 mobility configured cell set 502. A base station may configure CG5 1002 and CG6 1004 with a reference TAG ID. In an example, the reference TAG ID may be TAG0 1202. The reference tag ID may be the same as a TAG ID for pTAG 518 (e.g., "0"). The base station may also configure CG5 1002 and CG6 1004 with an information element "DeltaTag=True." As CG5 1002 and CG6 1004 have "DeltaTag=True," respective TAs of CG5 1002 and CG6 1004 may be a delta timing with respect to a TA associated with the reference TAG. Each cell within CG5 1002 and CG6 1004 may have a provided offset in TA as compared to the reference TAG.

For example, referring to FIG. 13 at 1310, the TAG ID configuration received by the UE 1302 may include an indication of a reference tag and TA offsets for cells or CGs. The UE 1302 may determine TAs for the cell groups based upon a TA associated with the reference TAG ID and the TA offsets.

FIG. 14 is a flowchart 1400 of a method of wireless communication. The method may be performed by a UE (e.g., the UE 104, the UE 402, the UE 504, the UE 1302, the apparatus 1804). In an example, the method may be performed by the TAG component 198. The method may be associated with various technical advantages at the UE, such as a more rapid change in pTAG/TAG associations in comparison to RRC signaling based approaches.

At 1402, the UE receives a L1 mobility cell configuration or a L2 mobility cell configuration for a set of cell groups, where each cell group in the set of cell groups includes a plurality of cells, where a first cell group in the set of cell groups is associated with a pTAG and a second cell group in the set of cell groups is associated with a sTAG, where the pTAG is associated with a first TA and the sTAG is associated with a second TA. For example, FIG. 13 at 1306 shows the UE 1302 receiving a L1/L2 mobility cell configuration. In another example, the L1 mobility cell configuration or the L2 mobility cell configuration for a set of cell groups may add the set of cell groups to the L1/L2 mobility configured cell set 502 in FIG. 5. Following the example depicted in FIG. 5, the first cell group may be CG1 506 and the second cell group may be CG2 508, where CG1 506 may be associated with pTAG 518 and CG2 508 may be associated with sTAG1 520. For example, 1402 may be performed by the TAG component 198.

At 1404, the UE receives L1 signaling or L2 signaling that associates the second cell group with the pTAG and the first cell group with the sTAG. For example, FIG. 13 at 1314 shows the UE 1302 receiving L1/L2 signaling changing pTAG/sTAG associations. In a further example, referring to FIG. 6, the L1 signaling or the L2 signaling may associate CG1 506 with sTAG1 520 and CG2 508 with pTAG 518. In yet another example, the L1 signaling or the L2 signaling may be the L1/L2 signaling 802 illustrated in FIG. 8. For example, 1404 may be performed by the TAG component 198.

Figure 15:
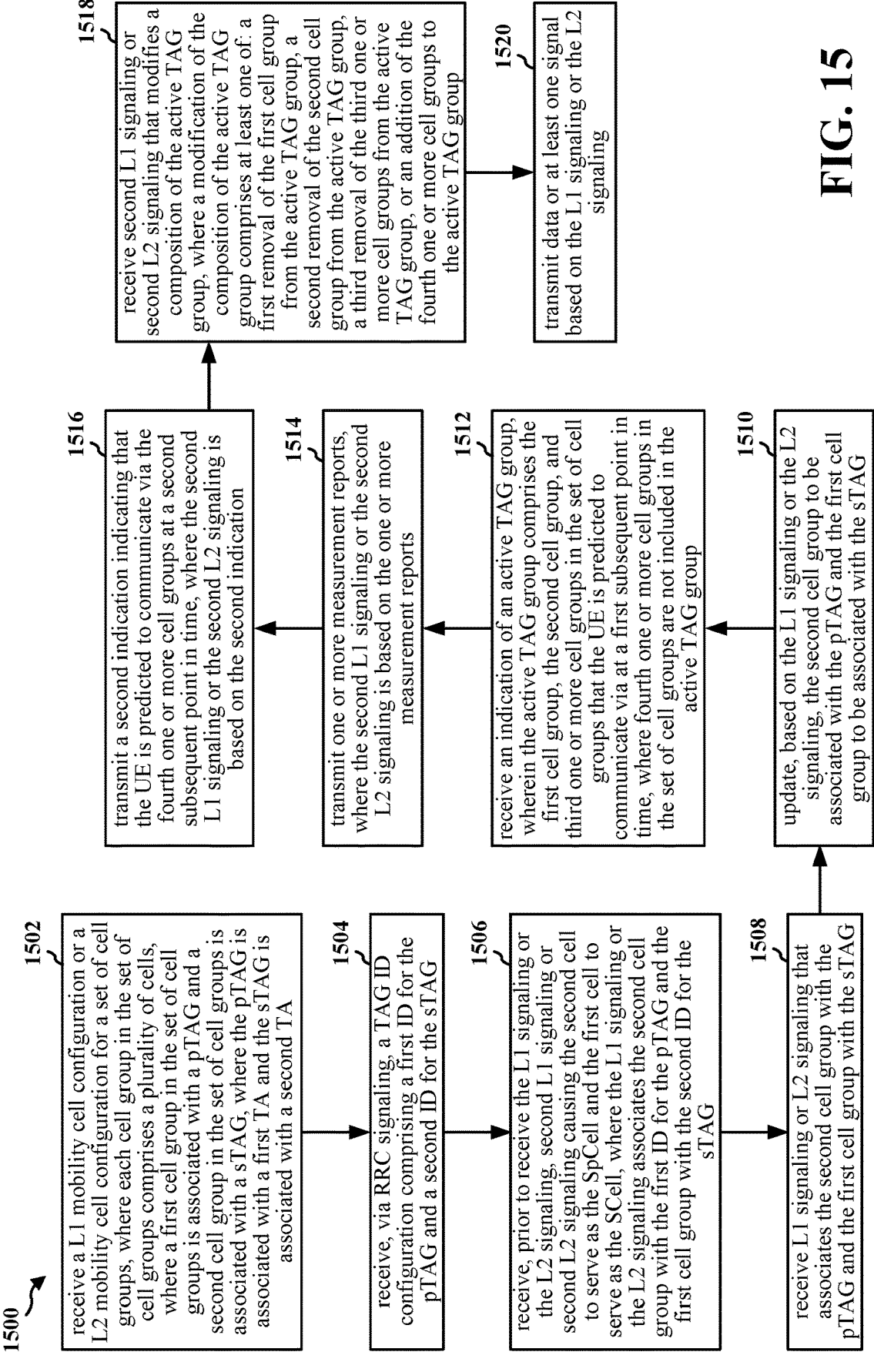
FIG. 15 is a flowchart of a method of wireless communication.

FIG. 15 is a flowchart 1500 of a method of wireless communication. The method may be performed by a UE (e.g., the UE 104, the UE 402, the UE 504, the UE 1302, the apparatus 1804). In an example, the method (including the various aspects described below) may be performed by the TAG component 198. The method may be associated with various technical advantages at the UE, such as a more rapid change in pTAG/TAG associations in comparison to RRC signaling based approaches.

At 1502, the UE receives a L1 mobility cell configuration or a L2 mobility cell configuration for a set of cell groups, where each cell group in the set of cell groups includes a plurality of cells, where a first cell group in the set of cell groups is associated with a pTAG and a second cell group in the set of cell groups is associated with a sTAG, where the pTAG is associated with a first TA and the sTAG is associated with a second TA. For example, FIG. 13 at 1306 shows the UE 1302 receiving a L1/L2 mobility cell configuration. In another example, the L1 mobility cell configuration or the L2 mobility cell configuration for a set of cell groups may add the set of cell groups to the L1/L2 mobility configured cell set 502 in FIG. 5. Following the example depicted in FIG. 5, the first cell group may be CG1 506 and the second cell group may be CG2 508, where CG1 506 may be associated with pTAG 518 and CG2 508 may be associated with sTAG1 520. For example, 1502 may be performed by the TAG component 198.

At 1508, the UE receives L1 signaling or L2 signaling that associates the second cell group with the pTAG and the first cell group with the sTAG. For example, FIG. 13 at 1314 shows the UE 1302 receiving L1/L2 signaling changing pTAG/sTAG associations. In a further example, referring to FIG. 6, the L1 signaling or the L2 signaling may associate CG1 506 with sTAG1 520 and CG2 508 with pTAG 518. In yet another example, the L1 signaling or the L2 signaling may be the L1/L2 signaling 802 illustrated in FIG. 8. For example, 1508 may be performed by the TAG component 198.

In one aspect, at 1510, the UE may update, based on the L1 signaling or the L2 signaling, the second cell group to be associated with the pTAG and the first cell group to be associated with the sTAG. For example, FIG. 13 at 1316 shows the UE 1302 updating pTAG/sTAG associations based on the L1/L2 signaling received at 1314. In a further example, referring to FIG. 6, the UE 504 may associate CG1 506 with sTAG1 520 and CG2 508 with pTAG 518 based on the L1 signaling or the L2 signaling. In another example, the L1 signaling or the L2 signaling may be the L1/L2 signaling 802 depicted in FIG. 8. For example, 1510 may be performed by the TAG component 198.

In one aspect, at 1504, the UE may receive, via RRC signaling, a TAG ID configuration including a first ID for the pTAG and a second ID for the sTAG. For example, FIG. 13 at 1310 shows the UE 1302 receiving a TAG ID configuration. In another example, the TAG ID configuration may be the serving cell configuration 708 illustrated in FIG. 7. Following the example in FIG. 7, the pTAG may pTAG 712 and the sTAG may be sTAG1 714. Tag "0" in the set of TAG IDs 710 may be the first ID and tag "1" in the set of TAG IDs 710 may be the second ID. For example, 1504 may be performed by the TAG component 198.

In one aspect, the first cell group may include a first cell that serves as a SpCell prior to receiving the L1 signaling or the L2 signaling, where the second cell group may include a second cell that serves as a SCell prior to receiving the L1 signaling or the L2 signaling. For example, referring to FIG. 4, the first cell may be the SpCell 426 and the second cell may be the first SCell 420. In another example, referring to FIG. 5, the first cell group may be CG1 506 that may include the PCell 516 and the second cell group may be CG2 508 that may include one or more SCells.

In one aspect, at 1506, the UE may receive, prior to receiving the L1 signaling or the L2 signaling, second L1 signaling or second L2 signaling that may cause the second cell to serve as the SpCell and the first cell to serve as the SCell, where the L1 signaling or the L2 signaling may associate the second cell group with the first ID for the pTAG and the first cell group with the second ID for the sTAG. For example, FIG. 13 at 1312 shows the UE 1302 receiving L1/L2 signaling that changes an identity of the SpCell. In another example, referring to FIG. 8, the L1 signaling or the L2 signaling may be the L1/L2 signaling 802 (dedicated explicit). For example, 1506 may be performed by the TAG component 198.

In one aspect, the L1 signaling or the L2 signaling may cause the second cell to serve as the SpCell and the first cell to serve as the SCell, where the L1 signaling or the L2 signaling may indicate that the second cell group is to be associated with the first ID for the pTAG and that the first cell group is to be associated with the second ID for the sTAG. For example, FIG. 13 at 1314 shows that the L1/L2 signaling that changes the pTAG/sTAG may change the SpCell. In another example, referring to FIG. 8, the L1 signaling or the L2 signaling may be the L1/L2 signaling 802 (joint explicit).

In one aspect, the L1 signaling or the L2 signaling may cause the second cell to serve as the SpCell and the first cell to serve as the SCell, where the second cell group may be associated with the first ID for the pTAG and the first cell group may be associated with the second ID for the sTAG based on receiving the L1 signaling or the L2 signaling. For example, FIG. 13 at 1312 shows the UE 1302 receiving L1/L2 signaling that changes an identity of the SpCell. In another example, referring to FIG. 8, the L1 signaling or the L2 signaling may be the L1/L2 signaling 802 (implicit).

In one aspect, a first number of cell groups in the set of cell groups is greater than a second number of available IDs for TAGs and the TAG ID configuration may configure a third number of IDs for the TAGs that is greater than the second number, where the L2 signaling may include a MAC-CE associated with a LCID, where a portion of the MAC-CE and the LCID may indicate an ID for a TAG. For example, FIG. 9 illustrates a MAC-CE 902 and a LCID 908, where the TAG ID 904 of the MAC-CE 902 and the LCID 908 may indicate an ID for a TAG. In another example, FIGS. 11 and 12 illustrate a scenario in which four TAG IDs are available and six cells groups are within the L1/L2 mobility configured cell set 502.

In one aspect, a first number of cell groups in the set of cell groups is greater than a second number of available IDs for TAGs, where the TAG ID configuration may configure a third number of IDs for the TAGs that is greater than the second number, where the L2 signaling may include a MAC-CE, where a portion of the MAC-CE may indicate an ID for a TAG. For example, FIG. 9 illustrates a MAC-CE 910, where the TAG ID 912 of the MAC-CE indicates an ID for a TAG. In another example, FIGS. 11 and 12 illustrate a scenario in which four TAG IDs are available and six cells groups are within the L1/L2 mobility configured cell set 502.

In one aspect, at 1512, a first number of cell groups in the set of cell groups is greater than a second number of available IDs for TAGs and the UE may receive an indication of an active TAG group, where the active TAG group may include the first cell group, the second cell group, and third one or more cell groups in the set of cell groups that the UE is predicted to communicate via at a first subsequent point in time, where fourth one or more cell groups in the set of cell groups are not included in the active TAG group. For example, FIG. 13 at 1318 shows the UE 1302 receiving an indication of an active TAG group. In another example, FIG.

10 depicts an active TAG group 1006. The active TAG group 1006 may include cell groups that the UE 504 is currently communication with (CG1 506 and CG2 508) and cell groups that the UE 504 is predicted to communication with (CG3 510 and CG4 512). CG5 1002 and CG6 1004 may not be included in the active TAG group 1006. For example, 1512 may be performed by the TAG component 198.

In one aspect, the first cell group, the second cell group, and the third one or more cell groups included in the active TAG group may be synchronized with the UE, where the fourth one or more cell groups not included in the active TAG group may not be synchronized with the UE based on the fourth one or more cell groups not being included in the active TAG group. For example, FIG. 10 shows that CG1 506, CG2 508, CG3 510, and CG4 512 have information element "CellSync=True" and CG5 1002 and CG6 1004 have information "CellSync=False."

In one aspect, at 1518, the UE may receive second L1 signaling or second L2 signaling that modifies a composition of the active TAG group, where a modification of the composition of the active TAG group includes at least one of: a first removal of the first cell group from the active TAG group, a second removal of the second cell group from the active TAG group, a third removal of the third one or more cell groups from the active TAG group, or an addition of the fourth one or more cell groups to the active TAG group. For example, FIG. 13 at 1324 shows the UE 1302 receiving a modification to the active TAG group, and the modification may be received via L1/L2 signaling. In another example, FIG. 11 shows CG1 506 and CG2 508 being removed from the active TAG group 1006 and CG5 1002 and CG6 1004 being added to the active TAG group 1006 based on L1/L2 signaling. For example, 1518 may be performed by the TAG component 198.

In one aspect, at 1520, the UE may transmit data or at least one signal based on the L1 signaling or the L2 signaling. For example, FIG. 13 at 1321 shows that the UE 1302 may transmit data and/or signal(s) based on the L1 signaling or the L2 signaling received at 1314. In an example, the UE may transmit data and/or signal(s) with the first TA or the second TA. For example, 1520 may be performed by the TAG component 198.

In one aspect, at 1514, the UE may transmit one or more measurement reports, where the second L1 signaling or the second L2 signaling may be based on the one or more measurement reports. For example, FIG. 13 at 1319 shows the UE 1302 performing measurement(s) and FIG. 13 at 1322 shows the UE 1302 transmitting measurement report(s). For example, 1514 may be performed by the TAG component 198.

In one aspect, at 1516, the UE may transmit a second indication indicating that the UE is predicted to communicate via the fourth one or more cell groups at a second subsequent point in time, where the second L1 signaling or the second L2 signaling may be based on the second indication. For example, FIG. 13 at 1320 shows the UE 1302 generating predictions and FIG. 13 at 1322 shows the UE 1302 transmitting the predictions. For example, 1516 may be performed by the TAG component 198.

In one aspect, the second L1 signaling or the second L2 signaling may be based on one or more frequency bands associated with the set of cell groups. For example, referring to FIG. 13, the modification received by the UE 1302 at 1324 may be based on one or more frequency bands associated with the set of cell groups. In an example, the one or more frequency bands may be associated with CG1 506, CG2 508, CG3 510, CG4 512, CG5 1002, and/or CG6 1004.

In one aspect, a first number of cell groups in the set of cell groups is greater than a second number of available IDs for TAGs, where the TAG ID configuration may further include a reference TAG ID that is associated with each of one or more cell groups in the set of cell groups. FIG. 12 illustrates a scenario in which four TAG IDs are available and six cells groups are within the L1/L2 mobility config-ured cell set 502. The reference TAG ID may be TAG0 1202 illustrated in FIG. 12.

In one aspect, TAs of each of the one or more cell groups may be determined based on one or more TA offsets with respect to a TA associated with the reference TAG ID, where the one or more TA offsets may be included in the TAG ID configuration. For example, referring to FIG. 12, TAs of CG5 1002 and CG6 1004 may be determined based upon a TA offset and the TAG0 1202.

In one aspect, the L1 signaling or the L2 signaling may be received based on a change in location of the UE. For example, FIGS. 5 and 6 illustrate movement of the UE 504. For example, referring to FIG. 13, the L1/L2 signaling received at 1314 may be based on movement of the UE 504.

FIG. 16 is a flowchart 1600 of a method of wireless communication. The method may be performed by a net-work entity (e.g., the base station 102, the base station 1304, the CU 110, the DU 130, the RU 140, the network entity 1802). In an example, the method may be performed by the TAG component 199. The method may be associated with various technical advantages at the network entity, such as a more rapid change in pTAG/TAG associations in com-parison to RRC signaling based approaches.

At 1602, the network entity transmits a L1 mobility cell configuration or a L2 mobility cell configuration for a set of cell groups for a UE, where each cell group in the set of cell groups includes a plurality of cells, where a first cell group in the set of cell groups is associated with a pTAG and a second cell group in the set of cell groups is associated with a sTAG, where the pTAG is associated with a first TA and the sTAG is associated with a second TA. For example, FIG. 13 at 1306 shows the base station 1304 transmitting a L1/L2 mobility cell configuration. In another example, the L1 mobility cell configuration or the L2 mobility cell configu-ration for a set of cell groups may add the set of cell groups to the L1/L2 mobility configured cell set 502 in FIG. 5. Following the example depicted in FIG. 5, the first cell group may be CG1 506 and the second cell group may be CG2 508, where CG1 506 may be associated with pTAG 518 and CG2 508 may be associated with sTAG1 520. For example, 1602 may be performed by the TAG component 199.

At 1604, the network entity transmits L1 signaling or L2 signaling that associates the second cell group with the pTAG and the first cell group with the sTAG. For example, FIG. 13 at 1314 shows the base station 1304 transmitting L1/L2 signaling changing pTAG/sTAG associations. In a further example, referring to FIG. 6, the L1 signaling or the L2 signaling may associate CG1 506 with sTAG1 520 and CG2 508 with pTAG 518. In yet another example, the L1 signaling or the L2 signaling may be the L1/L2 signaling 802 illustrated in FIG. 8. For example, 1604 may be per-formed by the TAG component 199.

FIG. 17 is a flowchart 1700 of a method of wireless communication. The method may be performed by a net-work entity (e.g., the base station 102, the base station 1304, the CU 110, the DU 130, the RU 140, the network entity 1802). In an example, the method (including the various aspects described below) may be performed by the TAG component 199. The method may be associated with various technical advantages at the network entity, such as a more rapid change in pTAG/TAG associations in comparison to RRC signaling based approaches.

At 1702, the network entity transmits a L1 mobility cell configuration or a L2 mobility cell configuration for a set of cell groups for a UE, where each cell group in the set of cell groups includes a plurality of cells, where a first cell group in the set of cell groups is associated with a pTAG and a second cell group in the set of cell groups is associated with a sTAG, where the pTAG is associated with a first TA and the sTAG is associated with a second TA. For example, FIG. 13 at 1306 shows the base station 1304 transmitting a L1/L2 mobility cell configuration. In another example, the L1 mobility cell configuration or the L2 mobility cell configu-ration for a set of cell groups may add the set of cell groups to the L1/L2 mobility configured cell set 502 in FIG. 5. Following the example depicted in FIG. 5, the first cell group may be CG1 506 and the second cell group may be CG2 508, where CG1 506 may be associated with pTAG 518 and CG2 508 may be associated with sTAG1 520. For example, 1702 may be performed by the TAG component 199.

At 1708, the network entity transmits L1 signaling or L2 signaling that associates the second cell group with the pTAG and the first cell group with the sTAG. For example, FIG. 13 at 1314 shows the base station 1304 transmitting L1/L2 signaling changing pTAG/sTAG associations. In a further example, referring to FIG. 6, the L1 signaling or the L2 signaling may associate CG1 506 with sTAG1 520 and CG2 508 with pTAG 518. In yet another example, the L1 signaling or the L2 signaling may be the L1/L2 signaling 802 illustrated in FIG. 8. For example, 1708 may be per-formed by the TAG component 199.

In one aspect, at 1704, the network entity may transmit, via RRC signaling, a TAG ID configuration including a first ID for the pTAG and a second ID for the sTAG. For example, FIG. 13 at 1310 shows the base station 1304 transmitting a TAG ID configuration. In another example, the TAG ID configuration may be the serving cell configu-ration 708 illustrated in FIG. 7. Following the example in FIG. 7, the pTAG may pTAG 712 and the sTAG may be sTAG1 714. Tag "0" in the set of TAG IDs 710 may be the first ID and tag "1" in the set of TAG IDs 710 may be the second ID. For example, 1704 may be performed by the TAG component 199.

In one aspect, the first cell group may include a first cell that serves as a SpCell prior to transmit the L1 signaling or the L2 signaling, where the second cell group may include a second cell that serves as a SCell prior to transmitting the L1 signaling or the L2 signaling. For example, referring to FIG. 4, the first cell may be the SpCell 426 and the second cell may be the first SCell 420. In another example, referring to FIG. 5, the first cell group may be CG1 506 that may include the PCell 516 and the second cell group may be CG2 508 that may include one or more SCells.

In one aspect, at 1706, the network entity may transmit, prior to transmitting the L1 signaling or the L2 signaling, second L1 signaling or second L2 signaling causing the second cell to serve as the SpCell and the first cell to serve as the SCell, where the L1 signaling or the L2 signaling associates the second cell group with the first ID for the pTAG and the first cell group with the second ID for the sTAG. For example, FIG. 13 at 1312 shows the base station 1304 transmitting L1/L2 signaling that changes an identity of the SpCell. In another example, referring to FIG. 8, the L1 signaling or the L2 signaling may be the L1/L2 signaling

802 (dedicated explicit). For example, 1706 may be performed by the TAG component 199.

In one aspect, the L1 signaling or the L2 signaling may cause the second cell to serve as the SpCell and the first cell to serve as the SCell, where the L1 signaling or the L2 signaling may indicate that the second cell group is to be associated with the first ID for the pTAG and that the first cell group is to be associated with the second ID for the sTAG. For example, FIG. 13 at 1314 shows that the L1/L2 signaling that changes the pTAG/sTAG may change the SpCell. In another example, referring to FIG. 8, the L1 signaling or the L2 signaling may be the L1/L2 signaling 802 (joint explicit).

In one aspect, the L1 signaling or the L2 signaling may cause the second cell to serve as the SpCell and the first cell to serve as the SCell, where the second cell group may be associated with the first ID for the pTAG and the first cell group may be associated with the second ID for the sTAG based on transmitting the L1 signaling or the L2 signaling. For example, FIG. 13 at 1312 shows the base station 1304 transmitting L1/L2 signaling that changes an identity of the SpCell. In another example, referring to FIG. 8, the L1 signaling or the L2 signaling may be the L1/L2 signaling 802 (implicit).

In one aspect, a first number of cell groups in the set of cell groups is greater than a second number of available IDs for TAGs, where the TAG ID configuration may configure a third number of IDs for the TAGs that is greater than the second number, where the L2 signaling may include a MAC-CE associated with a LCID, where a portion of the MAC-CE and the LCID may indicate an ID for a TAG. For example, FIG. 9 illustrates a MAC-CE 902 and a LCID 908, where the TAG ID 904 of the MAC-CE 902 and the LCID 908 may indicate an ID for a TAG. In another example, FIGS. 11 and 12 illustrate a scenario in which four TAG IDs are available and six cells groups are within the L1/L2 mobility configured cell set 502.

In one aspect, a first number of cell groups in the set of cell groups is greater than a second number of available IDs for TAGs, where the TAG ID configuration may configure a third number of IDs for the TAGs that is greater than the second number, where the L2 signaling may include a MAC-CE, where a portion of the MAC-CE may indicate an ID for a TAG. For example, FIG. 9 illustrates a MAC-CE 910, where the TAG ID 912 of the MAC-CE indicates an ID for a TAG. In another example, FIGS. 11 and 12 illustrate a scenario in which four TAG IDs are available and six cells groups are within the L1/L2 mobility configured cell set 502.

In one aspect, at 1710, a first number of cell groups in the set of cell groups may be greater than a second number of available IDs for TAGs and the network entity may transmit an indication of an active TAG group, where the active TAG group includes the first cell group, the second cell group, and third one or more cell groups in the set of cell groups that the UE is predicted to communicate via at a first subsequent point in time, where fourth one or more cell groups in the set of cell groups are not included in the active TAG group. For example, FIG. 13 at 1318 shows the base station 1304 transmitting an indication of an active TAG group. In another example, FIG. 10 depicts an active TAG group 1006. The active TAG group 1006 may include cell groups that the UE 504 is currently communication with (CG1 506 and CG2 508) and cell groups that the UE 504 is predicted to communication with (CG3 510 and CG4 512). CG5 1002 and CG6 1004 may not be included in the active TAG group 1006. For example, 1710 may be performed by the TAG component 199.

In one aspect, the first cell group, the second cell group, and the third one or more cell groups included in the active TAG group may be synchronized with the UE, where the fourth one or more cell groups not included in the active TAG group may not be synchronized with the UE based on the fourth one or more cell groups not being included in the active TAG group. For example, FIG. 10 shows that CG1 506, CG2 508, CG3 510, and CG4 512 have information element "CellSync=True" and CG5 1002 and CG6 1004 have information "CellSync=False."

In one aspect, at 1718, the network entity may transmit second L1 signaling or second L2 signaling that modifies a composition of the active TAG group, where a modification of the composition of the active TAG group includes at least one of: a first removal of the first cell group from the active TAG group, a second removal of the second cell group from the active TAG group, a third removal of the third one or more cell groups from the active TAG group, or an addition of the fourth one or more cell groups to the active TAG group. For example, FIG. 13 at 1324 shows the base station 1304 transmitting a modification to the active TAG group, and the modification may be received via L1/L2 signaling. In another example, FIG. 11 shows CG1 506 and CG2 508 being removed from the active TAG group 1006 and CG5 1002 and CG6 1004 being added to the active TAG group 1006 based on L1/L2 signaling. For example, 1718 may be performed by the TAG component 199.

In one aspect, at 1720, the network entity may receive data or at least one signal based on the L1 signaling or the L2 signaling. For example, FIG. 13 at 1321 shows that the base station 1304 may receive data and/or signal(s) based on the L1 signaling or the L2 signaling transmitted at 1314. For example, 1720 may be performed by the TAG component 199.

In one aspect, at 1712, the network entity may receive one or more measurement reports, where the second L1 signaling or the second L2 signaling is based on the one or more measurement reports. For example, FIG. 13 at 1322 shows the base station 1304 receiving measurement report(s). For example, 1712 may be performed by the TAG component 199.

In one aspect, at 1714, the network entity may predict that the UE is to communicate via the fourth one or more cell groups at a second subsequent point in time based on the one or more measurement reports, where the second L1 signaling or the second L2 signaling may be based on the prediction. For example, FIG. 13 at 1326 shows the base station 1304 predicting an active TAG group based on measurement report(s). For example, 1714 may be performed by the TAG component 199.

In one aspect, at 1716, the network entity may receive a second indication indicating that the UE is predicted to communicate via the fourth one or more cell groups at a second subsequent point in time, where the second L1 signaling or the second L2 signaling may be based on the second indication. For example, FIG. 13 at 1322 shows the base station 1304 receiving a prediction. For example, 1716 may be performed by the TAG component 199.

In one aspect, the second L1 signaling or the second L2 signaling may be based on one or more frequency bands associated with the set of cell groups. For example, referring to FIG. 13, the modification transmitted by the base station 1304 at 1324 may be based on one or more frequency bands associated with the set of cell groups. In an example, the one or more frequency bands may be associated with CG1 506, CG2 508, CG3 510, CG4 512, CG5 1002, and/or CG6 1004.

In one aspect, where a first number of cell groups in the set of cell groups is greater than a second number of available IDs for TAGs, where the TAG ID configuration may further include a reference TAG ID that is associated with each of one or more cell groups in the set of cell groups. FIG. 12 illustrates a scenario in which four TAG IDs are available and six cells groups are within the L1/L2 mobility configured cell set 502. The reference TAG ID may be TAG0 1202 illustrated in FIG. 12.

In one aspect, TAs of each of the one or more cell groups may be determined based on one or more TA offsets with respect to a TA associated with the reference TAG ID, where the one or more TA offsets may be included in the TAG ID configuration. For example, referring to FIG. 12, TAs of CG5 1002 and CG6 1004 may be determined based upon a TA offset and the TAG0 1202.

In one aspect, the L1 signaling or the L2 signaling may be transmitted based on a change in location of the UE. For example, FIGS. 5 and 6 illustrate movement of the UE 504. For example, referring to FIG. 13, the L1/L2 signaling received at 1314 may be based on movement of the UE 504.

Figure 18:
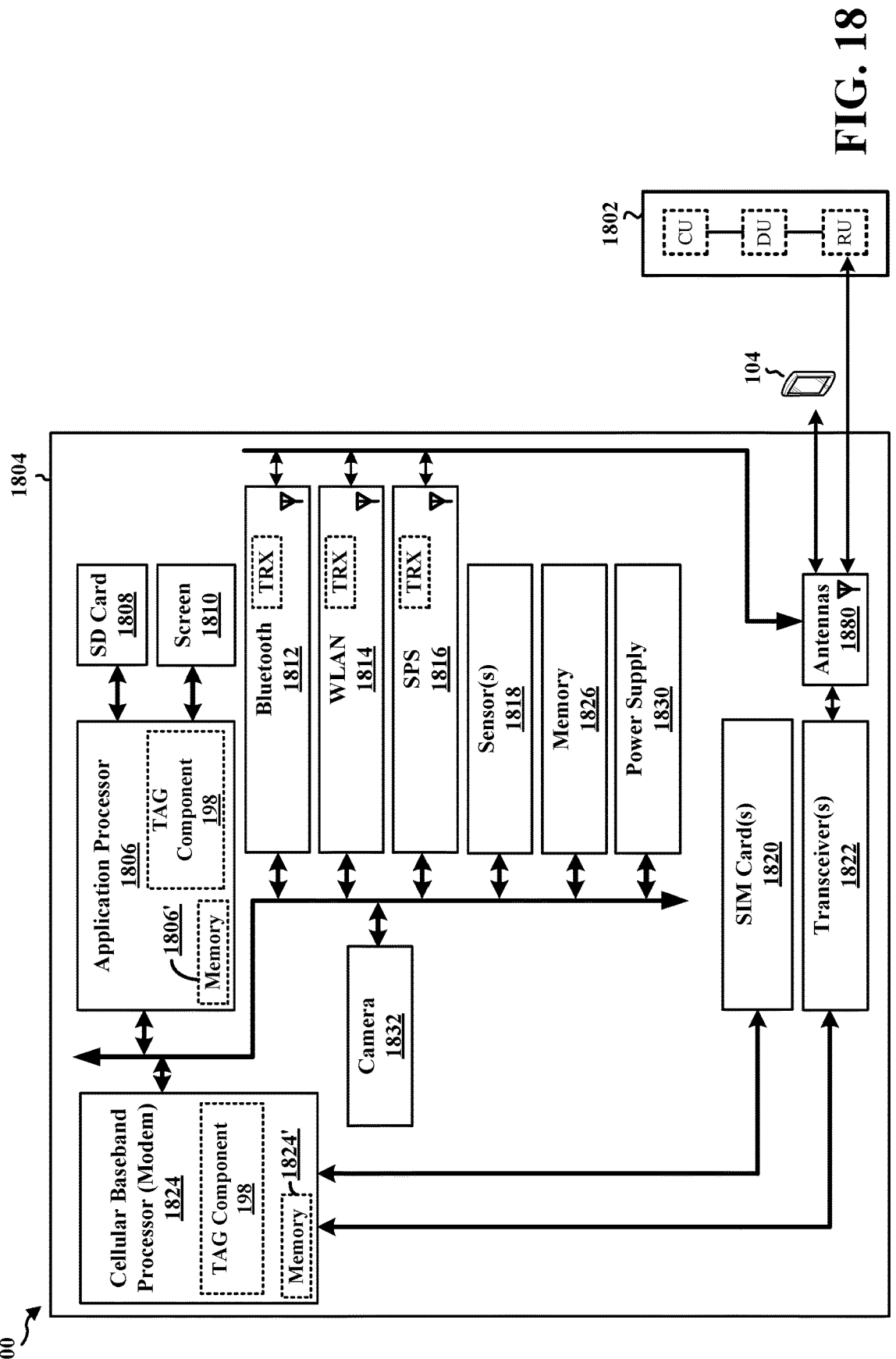
FIG. 18 is a diagram illustrating an example of a hardware implementation for an example apparatus and/or network entity.

FIG. 18 is a diagram 1800 illustrating an example of a hardware implementation for an apparatus 1804. The apparatus 1804 may be a UE, a component of a UE, or may implement UE functionality. In some aspects, the apparatus 1804 may include a cellular baseband processor 1824 (also referred to as a modem) coupled to one or more transceivers 1822 (e.g., cellular RF transceiver). The cellular baseband processor 1824 may include on-chip memory 1824'. In some aspects, the apparatus 1804 may further include one or more subscriber identity modules (SIM) cards 1820 and an application processor 1806 coupled to a secure digital (SD) card 1808 and a screen 1810. The application processor 1806 may include on-chip memory 1806'. In some aspects, the apparatus 1804 may further include a Bluetooth module 1812, a WLAN module 1814, an SPS module 1816 (e.g., GNSS module), one or more sensor modules 1818 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1826, a power supply 1830, and/or a camera 1832. The Bluetooth module 1812, the WLAN module 1814, and the SPS module 1816 may include an on-chip transceiver (TRX) (or in some cases, just a receiver (RX)). The Bluetooth module 1812, the WLAN module 1814, and the SPS module 1816 may include their own dedicated antennas and/or utilize the antennas 1880 for communication. The cellular baseband processor 1824 communicates through the transceiver(s) 1822 via one or more antennas 1880 with the UE 104 and/or with an RU associated with a network entity 1802. The cellular baseband processor 1824 and the application processor 1806 may each include a computer-readable medium/memory 1824', 1806', respectively. The additional memory modules 1826 may also be considered a computer-readable medium/memory. Each computer-readable medium/memory 1824', 1806', 1826 may be nontransitory. The cellular baseband processor 1824 and the application processor 1806 are each responsible for general processing, including the execution of software stored on the computer-readable medium/memory. The software, when executed by the cellular baseband processor 1824/application processor 1806, causes the cellular baseband processor 1824/application processor 1806 to perform the various functions described supra. The computer-readable medium/ memory may also be used for storing data that is manipulated by the cellular baseband processor 1824/application processor 1806 when executing software. The cellular baseband processor 1824/application processor 1806 may be a component of the UE 350 and may include the memory 360 and/or at least one of the TX processor 368, the RX processor 356, and the controller/processor 359. In one configuration, the apparatus 1804 may be a processor chip (modem and/or application) and include just the cellular baseband processor 1824 and/or the application processor 1806, and in another configuration, the apparatus 1804 may be the entire UE (e.g., see 350 of FIG. 3) and include the additional modules of the apparatus 1804.

As discussed supra, the TAG component 198 is configured to receive a L1 mobility cell configuration or a L2 mobility cell configuration for a set of cell groups, where each cell group in the set of cell groups includes a plurality of cells, where a first cell group in the set of cell groups is associated with a pTAG and a second cell group in the set of cell groups is associated with a sTAG, where the pTAG is associated with a first TA and the sTAG is associated with a second TA. The TAG component 198 is also configured to receive L1 signaling or L2 signaling that associates the second cell group with the pTAG and the first cell group with the sTAG. The TAG component 198 may be within the cellular baseband processor 1824, the application processor 1806, or both the cellular baseband processor 1824 and the application processor 1806. The TAG component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1804 may include a variety of components configured for various functions. In one configuration, the apparatus 1804, and in particular the cellular baseband processor 1824 and/or the application processor 1806, includes means for receiving a L1 mobility cell configuration or a L2 mobility cell configuration for a set of cell groups, where each cell group in the set of cell groups includes a plurality of cells, where a first cell group in the set of cell groups is associated with a pTAG and a second cell group in the set of cell groups is associated with a sTAG, where the pTAG is associated with a first TA and the sTAG is associated with a second TA. In one configuration, the apparatus 1804, and in particular the cellular baseband processor 1824 and/or the application processor 1806, includes means for receiving L1 signaling or L2 signaling that associates the second cell group with the pTAG and the first cell group with the sTAG. In one configuration, the apparatus 1804, and in particular the cellular baseband processor 1824 and/or the application processor 1806, includes means for updating, based on the L1 signaling or the L2 signaling, the second cell group to be associated with the pTAG and the first cell group to be associated with the sTAG. In one configuration, the apparatus 1804, and in particular the cellular baseband processor 1824 and/or the application processor 1806, includes means for receiving, via RRC signaling, a TAG ID configuration including a first ID for the pTAG and a second ID for the sTAG. In one configuration, the apparatus 1804, and in particular the cellular baseband processor 1824 and/or the application processor 1806, includes means for receiving, prior to receiving the L1 signaling or the L2 signaling, second L1 signaling or second L2 signaling causing the second cell to serve as the SpCell and the first cell to serve as the SCell, where the L1 signaling or the L2 signaling associates the second cell group with the first ID for the pTAG and the first cell group with the second ID for the sTAG. In one configuration, where a first number of cell groups in the set of cell groups is greater than a second number of available IDs for TAGs, the apparatus 1804, and in particular the cellular baseband processor 1824 and/or the application processor 1806, includes means for receiving an indication of an active TAG group, where the active TAG group includes the first cell group, the second cell group, and third one or more cell groups in the set of cell groups that the UE is predicted to communicate via at a first subsequent point in time, where fourth one or more cell groups in the set of cell groups are not included in the active TAG group. In one configuration, the apparatus 1804, and in particular the cellular baseband processor 1824 and/or the application processor 1806, includes means for receiving second L1 signaling or second L2 signaling that modifies a composition of the active TAG group, where a modification of the composition of the active TAG group includes at least one of: a first removal of the first cell group from the active TAG group, a second removal of the second cell group from the active TAG group, a third removal of the third one or more cell groups from the active TAG group, or an addition of the fourth one or more cell groups to the active TAG group. In one configuration, the apparatus 1804, and in particular the cellular baseband processor 1824 and/or the application processor 1806, includes means for transmitting one or more measurement reports, where the second L1 signaling or the second L2 signaling is based on the one or more measurement reports. In one configuration, the apparatus 1804, and in particular the cellular baseband processor 1824 and/or the application processor 1806, includes means for transmitting a second indication indicating that the UE is predicted to communicate via the fourth one or more cell groups at a second subsequent point in time, where the second L1 signaling or the second L2 signaling is based on the second indication. The means may be the TAG component 198 of the apparatus 1804 configured to perform the functions recited by the means. As described supra, the apparatus 1804 may include the TX processor 368, the RX processor 356, and the controller/processor 359. As such, in one configuration, the means may be the TX processor 368, the RX processor 356, and/or the controller/processor 359 configured to perform the functions recited by the means.

Figure 19:
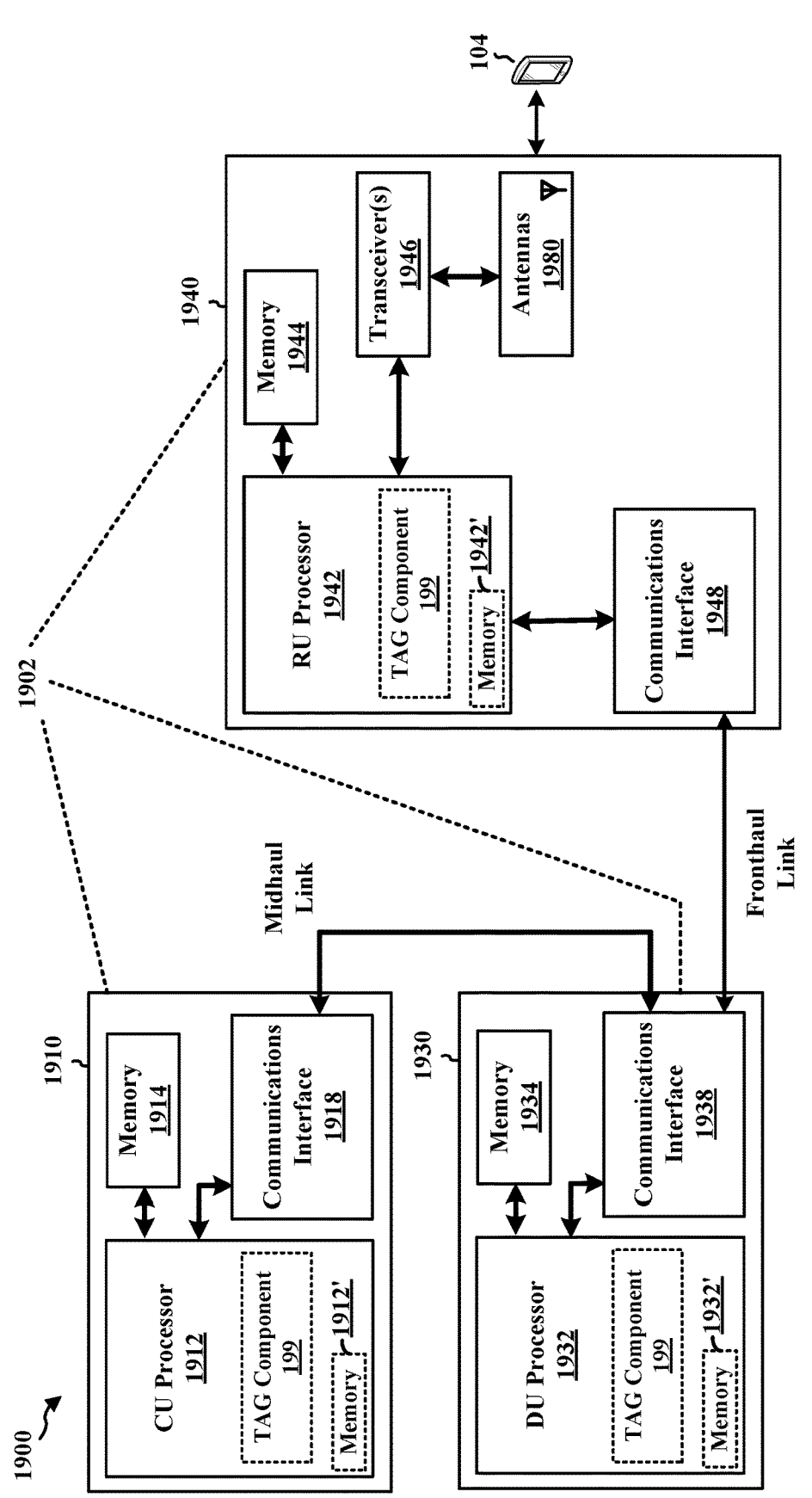
FIG. 19 is a diagram illustrating an example of a hardware implementation for an example network entity.

FIG. 19 is a diagram 1900 illustrating an example of a hardware implementation for a network entity 1902. The network entity 1902 may be a BS, a component of a BS, or may implement BS functionality. The network entity 1902 may include at least one of a CU 1910, a DU 1930, or an RU 1940. For example, depending on the layer functionality handled by the TAG component 199, the network entity 1902 may include the CU 1910; both the CU 1910 and the DU 1930; each of the CU 1910, the DU 1930, and the RU 1940; the DU 1930; both the DU 1930 and the RU 1940; or the RU 1940. The CU 1910 may include a CU processor 1912. The CU processor 1912 may include on-chip memory 1912'. In some aspects, the CU 1910 may further include additional memory modules 1914 and a communications interface 1918. The CU 1910 communicates with the DU 1930 through a midhaul link, such as an F1 interface. The DU 1930 may include a DU processor 1932. The DU processor 1932 may include on-chip memory 1932'. In some aspects, the DU 1930 may further include additional memory modules 1934 and a communications interface 1938. The DU 1930 communicates with the RU 1940 through a fronthaul link. The RU 1940 may include an RU processor 1942. The RU processor 1942 may include on-chip memory 1942'. In some aspects, the RU 1940 may further include additional memory modules 1944, one or more transceivers 1946, antennas 1980, and a communications interface 1948. The RU 1940 communicates with the UE 104. The on-chip memory 1912', 1932', 1942' and the additional memory modules 1914, 1934, 1944 may each be considered a computer-readable medium/memory. Each computer-readable medium/memory may be non-transitory. Each of the processors 1912, 1932, 1942 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the TAG component 199 is configured to transmit a L1 mobility cell configuration or a L2 mobility cell configuration for a set of cell groups for a UE, where each cell group in the set of cell groups includes a plurality of cells, where a first cell group in the set of cell groups is associated with a pTAG and a second cell group in the set of cell groups is associated with a sTAG, where the pTAG is associated with a first TA and the sTAG is associated with a second TA. The TAG component 199 is configured to transmit L1 signaling or L2 signaling that associates the second cell group with the pTAG and the first cell group with the sTAG. The TAG component 199 may be within one or more processors of one or more of the CU 1910, DU 1930, and the RU 1940. The TAG component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1902 may include a variety of components configured for various functions. In one configuration, the network entity 1902 includes means for transmitting a L1 mobility cell configuration or a L2 mobility cell configuration for a set of cell groups for a UE, where each cell group in the set of cell groups includes a plurality of cells, where a first cell group in the set of cell groups is associated with a pTAG and a second cell group in the set of cell groups is associated with a sTAG, where the pTAG is associated with a first TA and the sTAG is associated with a second TA. In one configuration, the network entity 1902 includes means for transmitting L1 signaling or L2 signaling that associates the second cell group with the pTAG and the first cell group with the sTAG. In one configuration, the network entity 1902 includes means for transmitting, via RRC signaling, a TAG ID configuration including a first ID for the pTAG and a second ID for the sTAG. In one configuration, the network entity 1902 includes means for transmitting, prior to transmitting the L1 signaling or the L2 signaling, second L1 signaling or second L2 signaling causing the second cell to serve as the SpCell and the first cell to serve as the SCell, where the L1 signaling or the L2 signaling associates the second cell group with the first ID for the pTAG and the first cell group with the second ID for the sTAG. In one configuration, where a first number of cell groups in the set of cell groups is greater than a second number of available IDs for TAGs, the network entity 1902 includes means for transmitting an indication of an active TAG group, where the active TAG group includes the first cell group, the second cell group, and third one or more cell groups in the set of cell groups that the UE is predicted to communicate via at a first subsequent point in time, where fourth one or more cell groups in the set of cell groups are not included in the active TAG group. In one configuration, the network entity 1902 includes means for transmitting second L1 signaling or second L2 signaling that modifies a composition of the active TAG group, where a modification of the composition of the active TAG group includes at least one of: a first removal of the first cell group from the active TAG group, a second removal of the second cell group from the active TAG group, a third removal of the third one or more cell groups from the active TAG group, or an addition of the fourth one or more cell groups to the active TAG group. In one configuration, the network entity 1902 includes means for receiving one or more measurement reports, where the second L1 signaling or the second L2 signaling is based on the one or more measurement reports. In one configuration, the network entity 1902 includes means for predicting that the UE is to communicate via the fourth one or more cell groups at a second subsequent point in time based on the one or more measurement reports, where the second L1 signaling or the second L2 signaling is based on the prediction. In one configuration, the network entity 1902 includes means for receiving a second indication indicating that the UE is predicted to communicate via the fourth one or more cell groups at a second subsequent point in time, where the second L1 signaling or the second L2 signaling is based on the second indication. The means may be the TAG component 199 of the network entity 1902 configured to perform the functions recited by the means. As described supra, the network entity 1902 may include the TX processor 316, the RX processor 370, and the controller/processor 375. As such, in one configuration, the means may be the TX processor 316, the RX processor 370, and/or the controller/processor 375 configured to perform the functions recited by the means.

Cells may be configured for L1 or L2 mobility. Cells and/or cell groups within a L1/L2 mobility configured cell set may be associated with different TAGs, where a TAG may be associated with a timing advance (TA) that a UE may apply for communications via/with/over a cell belonging to the TAG. When an identity of a special cell (SpCell) changes within the L1/L2 mobility configured cell set and the new SpCell is not within the same TAG as the previous SpCell, a base station may change pTAG and sTAG associations, that is, the base station may transmit signaling which associates an ID for the pTAG with a cell group currently associated with the sTAG and which associates an ID for the sTAG with a cell group currently associated with the pTAG. A base station may change a TAG association of an SCell via RRC signaling. However, RRC signaling (i.e., layer 3 signaling) may be time consuming. Furthermore, a number of available TAG IDs may be limited and a number of cell groups in the L1/L2 mobility configured cell set may exceed the number of available TAG IDs. Various techniques for TAG maintenance, update, and signaling are disclosed herein. In an example, a UE receives a L1 mobility cell configuration or a L2 mobility cell configuration for a set of cell groups, where each cell group in the set of cell groups includes a plurality of cells, where a first cell group in the set of cell groups is associated with a pTAG and a second cell group in the set of cell groups is associated with a sTAG, where the pTAG is associated with a first TA and the sTAG is associated with a second TA. The UE receives L1 signaling or L2 signaling that associates the second cell group with the pTAG and the first cell group with the sTAG. The pTAG/sTAG associations may be updated for communications of the UE with cell(s) belonging to the pTAG/sTAGs based upon the L1 signaling or the L2 signaling without the UE receiving RRC signaling, which, as noted above, may be time consuming. Thus, the L1 signaling or the L2 signaling may be associated with increased communications reliability. Also disclosed herein are various techniques for managing TAG IDs when a number of cell groups exceeds a number of available TAG IDs.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), including: receiving a layer 1 (L1) mobility cell configuration or a layer 2 (L2) mobility cell configuration for a set of cell groups, where each cell group in the set of cell groups includes a plurality of cells, where a first cell group in the set of cell groups is associated with a primary timing advance group (pTAG) and a second cell group in the set of cell groups is associated with a secondary timing advance group (sTAG), where the pTAG is associated with a first timing advance (TA) and the sTAG is associated with a second TA and receiving L1 signaling or L2 signaling that associates the second cell group with the pTAG and the first cell group with the sTAG.

Aspect 2 is the method of aspect 1, further including: updating, based on the L1 signaling or the L2 signaling, the second cell group to be associated with the pTAG and the first cell group to be associated with the sTAG.

Aspect 3 is the method of any of aspects 1-2, further including: receiving, via radio resource control (RRC) signaling, a timing advance group (TAG) identifier (ID) configuration including a first ID for the pTAG and a second ID for the sTAG.

Aspect 4 is the method of aspect 3, where the first cell group includes a first cell that serves as a special cell (SpCell) prior to receiving the L1 signaling or the L2 signaling, where the second cell group includes a second cell that serves as a secondary cell (SCell) prior to receiving the L1 signaling or the L2 signaling.

Aspect 5 is the method of aspect 4, further including: receiving, prior to receiving the L1 signaling or the L2 signaling, second L1 signaling or second L2 signaling causing the second cell to serve as the SpCell and the first cell to serve as the SCell, where the L1 signaling or the L2 signaling associates the second cell group with the first ID for the pTAG and the first cell group with the second ID for the sTAG.

Aspect 6 is the method of aspect 4, where the L1 signaling or the L2 signaling causes the second cell to serve as the SpCell and the first cell to serve as the SCell, where the L1 signaling or the L2 signaling indicates that the second cell group is to be associated with the first ID for the pTAG and that the first cell group is to be associated with the second ID for the sTAG.

Aspect 7 is the method of aspect 4, where the L1 signaling or the L2 signaling causes the second cell to serve as the SpCell and the first cell to serve as the SCell, where the second cell group is associated with the first ID for the pTAG and the first cell group is associated with the second ID for the sTAG based on receiving the L1 signaling or the L2 signaling.

Aspect 8 is the method of any of aspects 3-7, where a first number of cell groups in the set of cell groups is greater than a second number of available IDs for TAGs, where the TAG ID configuration configures a third number of IDs for the TAGs that is greater than the second number, where the L2 signaling includes a medium access control (MAC) control element (MAC-CE) associated with a logical channel index (LCID), where a portion of the MAC-CE and the LCID indicate an ID for a TAG.

Aspect 9 is the method of any of aspects 3-7, where a first number of cell groups in the set of cell groups is greater than a second number of available IDs for TAGs, where the TAG ID configuration configures a third number of IDs for the TAGs that is greater than the second number, where the L2 signaling includes a medium access control (MAC) control element (MAC-CE), where a portion of the MAC-CE indicates an ID for a TAG.

Aspect 10 is the method of any of aspects 3-9, where a first number of cell groups in the set of cell groups is greater than a second number of available IDs for TAGs, further including: receiving an indication of an active TAG group, where the active TAG group includes the first cell group, the second cell group, and third one or more cell groups in the set of cell groups that the UE is predicted to communicate via at a first subsequent point in time, where fourth one or more cell groups in the set of cell groups are not included in the active TAG group.

Aspect 11 is the method of aspect 10, where the first cell group, the second cell group, and the third one or more cell groups included in the active TAG group are synchronized with the UE, where the fourth one or more cell groups not included in the active TAG group are not synchronized with the UE based on the fourth one or more cell groups not being included in the active TAG group.

Aspect 12 is the method of aspect 11, further including: receiving second L1 signaling or second L2 signaling that modifies a composition of the active TAG group, where a modification of the composition of the active TAG group includes at least one of: a first removal of the first cell group from the active TAG group, a second removal of the second cell group from the active TAG group, a third removal of the third one or more cell groups from the active TAG group, or an addition of the fourth one or more cell groups to the active TAG group.

Aspect 13 is the method of aspect 12, further including: transmitting one or more measurement reports, where the second L1 signaling or the second L2 signaling is based on the one or more measurement reports.

Aspect 14 is the method of any of aspects 12-13, further including: transmitting a second indication indicating that the UE is predicted to communicate via the fourth one or more cell groups at a second subsequent point in time, where the second L1 signaling or the second L2 signaling is based on the second indication.

Aspect 15 is the method of any of aspects 12-14, where the second L1 signaling or the second L2 signaling is based on one or more frequency bands associated with the set of cell groups.

Aspect 16 is the method of aspect 3, where a first number of cell groups in the set of cell groups is greater than a second number of available IDs for TAGs, where the TAG ID configuration further includes a reference TAG ID that is associated with each of one or more cell groups in the set of cell groups.

Aspect 17 is the method of aspect 16, where TAs of each of the one or more cell groups are determined based on one or more TA offsets with respect to a TA associated with the reference TAG ID, where the one or more TA offsets are included in the TAG ID configuration.

Aspect 18 is the method of any of aspects 1-17, where the L1 signaling or the L2 signaling is received based on a change in location of the UE.

Aspect 19 is the method of any of aspects 1-18, further include transmitting data or at least one signal based on the L1 signaling or the L2 signaling.

Aspect 20 is an apparatus for wireless communication at a user equipment (UE) including at least one memory and at least one processor coupled to the at least one memory and based at least in part on information stored in the at least one memory, the at least one processor, individually or in any combination, is configured to perform a method in accordance with any of aspects 1-18.

Aspect 21 is an apparatus for wireless communications, including means for performing a method in accordance with any of aspects 1-19.

Aspect 22 is the apparatus of aspect 20 or 21 further including at least one of a transceiver or an antenna coupled to the at least one processor, where to receive the L1 signaling or the L2 signaling, the at least one processor is configured to receive the L1 signaling or the L2 signaling via at least one of the transceiver or the antenna.

Aspect 23 is a computer-readable medium (e.g., a non-transitory computer-readable medium) including computer executable code that, when executed by at least one processor, causes the at least one processor to perform a method in accordance with any of aspects 1-19.

Aspect 24 is a method of wireless communication at a network entity, including: transmitting a layer 1 (L1) mobility cell configuration or a layer 2 (L2) mobility cell configuration for a set of cell groups for a user equipment (UE), where each cell group in the set of cell groups includes a plurality of cells, where a first cell group in the set of cell groups is associated with a primary timing advance group (pTAG) and a second cell group in the set of cell groups is associated with a secondary timing advance group (sTAG), where the pTAG is associated with a first timing advance (TA) and the sTAG is associated with a second TA; and transmitting L1 signaling or L2 signaling that associates the second cell group with the pTAG and the first cell group with the sTAG.

Aspect 25 is a method of aspect 24, further including: transmitting, via radio resource control (RRC) signaling, a timing advance group (TAG) identifier (ID) configuration including a first ID for the pTAG and a second ID for the sTAG.

Aspect 26 is a method of any of aspects 24-25, where the first cell group includes a first cell that serves as a special cell (SpCell) prior to transmitting the L1 signaling or the L2 signaling, where the second cell group includes a second cell that serves as a secondary cell (SCell) prior to transmitting the L1 signaling or the L2 signaling.

Aspect 27 is a method of aspect 26, further including: transmitting, prior to transmitting the L1 signaling or the L2 signaling, second L1 signaling or second L2 signaling causing the second cell to serve as the SpCell and the first cell to serve as the SCell, where the L1 signaling or the L2 signaling associates the second cell group with the first ID for the pTAG and the first cell group with the second ID for the sTAG.

Aspect 28 is a method of aspect 26, where the L1 signaling or the L2 signaling causes the second cell to serve as the SpCell and the first cell to serve as the SCell, where the L1 signaling or the L2 signaling indicates that the second cell group is to be associated with the first ID for the pTAG and that the first cell group is to be associated with the second ID for the sTAG.

Aspect 29 is a method of aspect 26, where the L1 signaling or the L2 signaling causes the second cell to serve as the SpCell and the first cell to serve as the SCell, where the second cell group is associated with the first ID for the pTAG and the first cell group is associated with the second ID for the sTAG based on transmitting the L1 signaling or the L2 signaling.

Aspect 30 is a method of aspect 25, where a first number of cell groups in the set of cell groups is greater than a second number of available IDs for TAGs, where the TAG ID configuration configures a third number of IDs for the TAGs that is greater than the second number, where the L2 signaling includes a medium access control (MAC) control element (MAC-CE) associated with a logical channel index (LCID), where a portion of the MAC-CE and the LCID indicate an ID for a TAG.

Aspect 31 is a method of aspect 25, where a first number of cell groups in the set of cell groups is greater than a second number of available IDs for TAGs, where the TAG ID configuration configures a third number of IDs for the TAGs that is greater than the second number, where the L2 signaling includes a medium access control (MAC) control element (MAC-CE), where a portion of the MAC-CE indicates an ID for a TAG.

Aspect 32 is a method of aspect 25, where a first number of cell groups in the set of cell groups is greater than a second number of available IDs for TAGs, further including: transmitting an indication of an active TAG group, where the active TAG group includes the first cell group, the second cell group, and third one or more cell groups in the set of cell groups that the UE is predicted to communicate via at a first subsequent point in time, where fourth one or more cell groups in the set of cell groups are not included in the active TAG group.

Aspect 33 is a method of aspect 32, where the first cell group, the second cell group, and the third one or more cell groups included in the active TAG group are synchronized with the UE, where the fourth one or more cell groups not included in the active TAG group are not synchronized with the UE based on the fourth one or more cell groups not being included in the active TAG group.

Aspect 34 is a method of aspect 33, further including: transmitting second L1 signaling or second L2 signaling that modifies a composition of the active TAG group, where a modification of the composition of the active TAG group includes at least one of: a first removal of the first cell group from the active TAG group, a second removal of the second cell group from the active TAG group, a third removal of the third one or more cell groups from the active TAG group, or an addition of the fourth one or more cell groups to the active TAG group.

Aspect 35 is a method of aspect 34, further including: receiving one or more measurement reports, where the second L1 signaling or the second L2 signaling is based on the one or more measurement reports.

Aspect 36 is a method of aspect 35, further including: predicting that the UE is to communicate via the fourth one or more cell groups at a second subsequent point in time based on the one or more measurement reports, where the second L1 signaling or the second L2 signaling is based on the prediction.

Aspect 37 is a method of any of aspects 35-36, further including: receiving a second indication indicating that the UE is predicted to communicate via the fourth one or more cell groups at a second subsequent point in time, where the second L1 signaling or the second L2 signaling is based on the second indication.

Aspect 38 is a method of aspect 34, where the second L1 signaling or the second L2 signaling is based on one or more frequency bands associated with the set of cell groups.

Aspect 39 is a method of aspect 25, where a first number of cell groups in the set of cell groups is greater than a second number of available IDs for TAGs, where the TAG ID configuration further includes a reference TAG ID that is associated with each of one or more cell groups in the set of cell groups.

Aspect 40 is a method of aspect 39, where TAs of each of the one or more cell groups are determined based on one or more TA offsets with respect to a TA associated with the reference TAG ID, where the one or more TA offsets are included in the TAG ID configuration.

Aspect 41 is a method of any of aspects 24-40, where the L1 signaling or the L2 signaling is transmitted based on a change in location of the UE.

Aspect 42 is a method of any of aspects 24-41, further comprising receiving data or at least one signal based on the L1 signaling or the L2 signaling.

Aspect 43 is an apparatus for wireless communication at a network entity including at least one memory and at least one processor coupled to the at least one memory and based at least in part on information stored in the at least one memory, the at least one processor, individually or in any combination, is configured to perform a method in accordance with any of aspects 24-42.

Aspect 44 is an apparatus for wireless communications, including means for performing a method in accordance with any of aspects 24-42.

Aspect 45 is the apparatus of aspect 43 or 44 further including at least one of a transceiver or an antenna coupled to the at least one processor, where to transmit the L1 signaling or the L2 signaling, the at least one processor is configured to transmit the L1 signaling or the L2 signaling via at least one of the transceiver or the antenna.

Aspect 46 is a computer-readable medium (e.g., a non-transitory computer-readable medium) including computer executable code that, when executed by at least one processor, cause the at least one processor to perform a method in accordance with any of aspects 24-42.

What is claimed is:

1. An apparatus for wireless communication at a user equipment (UE), comprising:

at least one memory; and at least one processor coupled to the at least one memory and, based at least in part on information stored in the at least one memory, the at least one processor is configured to:

receive a layer 1 (L1) mobility cell configuration or a layer 2 (L2) mobility cell configuration for a set of cell groups, wherein each cell group in the set of cell groups comprises a plurality of cells, wherein a first cell group in the set of cell groups is associated with a primary timing advance group (pTAG) and a second cell group in the set of cell groups is associated with a secondary timing advance group (sTAG), wherein the pTAG is associated with a first timing advance (TA) and the sTAG is associated with a second TA; and receive L1 signaling or L2 signaling that associates the second cell group with the pTAG and the first cell group with the sTAG.

2. The apparatus of claim 1, wherein the at least one processor is further configured to:

update, based on the L1 signaling or the L2 signaling, the second cell group to be associated with the pTAG and the first cell group to be associated with the sTAG.

3. The apparatus of claim 1, wherein the at least one processor is further configured to:

receive, via radio resource control (RRC) signaling, a timing advance group (TAG) identifier (ID) configuration comprising a first ID for the pTAG and a second ID for the sTAG.

4. The apparatus of claim 3, wherein the first cell group includes a first cell that serves as a special cell (SpCell) prior to reception of the L1 signaling or the L2 signaling, wherein the second cell group includes a second cell that serves as a secondary cell (SCell) prior to the reception of the L1 signaling or the L2 signaling.

5. The apparatus of claim 4, wherein the at least one processor is further configured to:

receive, prior to the reception of the L1 signaling or the L2 signaling, second L1 signaling or second L2 signaling that causes the second cell to serve as the SpCell and the first cell to serve as the SCell, wherein the L1 signaling or the L2 signaling associates the second cell group with the first ID for the pTAG and the first cell group with the second ID for the sTAG.

6. The apparatus of claim 4, wherein the L1 signaling or the L2 signaling causes the second cell to serve as the SpCell and the first cell to serve as the SCell, wherein the L1 signaling or the L2 signaling indicates that the second cell group is to be associated with the first ID for the pTAG and that the first cell group is to be associated with the second ID for the sTAG.

7. The apparatus of claim 4, wherein the L1 signaling or the L2 signaling causes the second cell to serve as the SpCell and the first cell to serve as the SCell, wherein the second cell group is associated with the first ID for the pTAG and the first cell group is associated with the second ID for the sTAG based on the reception of the L1 signaling or the L2 signaling.

8. The apparatus of claim 3, wherein a first number of cell groups in the set of cell groups is greater than a second number of available IDs for TAGs, wherein the TAG ID configuration configures a third number of IDs for the TAGs that is greater than the second number, wherein the L2 signaling comprises a medium access control (MAC) control element (MAC-CE) associated with a logical channel index (LCID), wherein a portion of the MAC-CE and the LCID indicate an ID for a TAG.

9. The apparatus of claim 3, wherein a first number of cell groups in the set of cell groups is greater than a second number of available IDs for TAGs, wherein the TAG ID configuration configures a third number of IDs for the TAGs that is greater than the second number, wherein the L2 signaling comprises a medium access control (MAC) control element (MAC-CE), wherein a portion of the MAC-CE indicates an ID for a TAG.

10. The apparatus of claim 3, wherein a first number of cell groups in the set of cell groups is greater than a second number of available IDs for TAGs, wherein the at least one processor is further configured to:

receive an indication of an active TAG group, wherein the active TAG group comprises the first cell group, the second cell group, and third one or more cell groups in the set of cell groups that the UE is predicted to communicate via at a first subsequent point in time, wherein fourth one or more cell groups in the set of cell groups are not included in the active TAG group.

11. The apparatus of claim 10, wherein the first cell group, the second cell group, and the third one or more cell groups included in the active TAG group are synchronized with the UE, wherein the fourth one or more cell groups not included in the active TAG group are not synchronized with the UE based on the fourth one or more cell groups not being included in the active TAG group.

12. The apparatus of claim 11, wherein the at least one processor is further configured to:

receive second L1 signaling or second L2 signaling that modifies a composition of the active TAG group, wherein a modification of the composition of the active TAG group comprises at least one of:

a first removal of the first cell group from the active TAG group, a second removal of the second cell group from the active TAG group, a third removal of the third one or more cell groups from the active TAG group, or an addition of the fourth one or more cell groups to the active TAG group.

13. The apparatus of claim 12, wherein the at least one processor is further configured to:

transmit one or more measurement reports, wherein the second L1 signaling or the second L2 signaling is based on the one or more measurement reports.

14. The apparatus of claim 12, wherein the at least one processor is further configured to:

transmit a second indication indicating that the UE is predicted to communicate via the fourth one or more cell groups at a second subsequent point in time, wherein the second L1 signaling or the second L2 signaling is based on the second indication.

15. The apparatus of claim 12, wherein the second L1 signaling or the second L2 signaling is based on one or more frequency bands associated with the set of cell groups.

16. The apparatus of claim 3, wherein a first number of cell groups in the set of cell groups is greater than a second number of available IDs for TAGs, wherein the TAG ID configuration further comprises a reference TAG ID that is associated with each of one or more cell groups in the set of cell groups.

17. The apparatus of claim 16, wherein TAs of each of the one or more cell groups are determined based on one or more TA offsets with respect to a TA associated with the reference TAG ID, wherein the one or more TA offsets are included in the TAG ID configuration.

18. The apparatus of claim 1, wherein the at least one processor is further configured to:

transmit data or at least one signal based on the L1 signaling or the L2 signaling.

19. The apparatus of claim 1, further comprising at least one of a transceiver or an antenna coupled to the at least one processor, wherein to receive the L1 signaling or the L2 signaling, the at least one processor is configured to receive the L1 signaling or the L2 signaling via at least one of the transceiver or the antenna.

20. An apparatus for wireless communication at a network entity, comprising:

at least one memory; and at least one processor coupled to the at least one memory and, based at least in part on information stored in the at least one memory, the at least one processor is configured to:

transmit a layer 1 (L1) mobility cell configuration or a layer 2 (L2) mobility cell configuration for a set of cell groups for a user equipment (UE), wherein each cell group in the set of cell groups comprises a plurality of cells, wherein a first cell group in the set of cell groups is associated with a primary timing advance group (pTAG) and a second cell group in the set of cell groups is associated with a secondary timing advance group (sTAG), wherein the pTAG is associated with a first timing advance (TA) and the sTAG is associated with a second TA; and transmit L1 signaling or L2 signaling that associates the second cell group with the pTAG and the first cell group with the sTAG.

21. The apparatus of claim 20, wherein the at least one processor is further configured to:

transmit, via radio resource control (RRC) signaling, a timing advance group (TAG) identifier (ID) configuration comprising a first ID for the pTAG and a second ID for the sTAG.

22. The apparatus of claim 21, wherein the first cell group includes a first cell that serves as a special cell (SpCell) prior to transmission of the L1 signaling or the L2 signaling, wherein the second cell group includes a second cell that serves as a secondary cell (SCell) prior to the transmission of the L1 signaling or the L2 signaling.

23. The apparatus of claim 22, wherein the at least one processor is further configured to:

transmit, prior to the transmission of the L1 signaling or the L2 signaling, second L1 signaling or second L2 signaling that causes the second cell to serve as the SpCell and the first cell to serve as the SCell, wherein the L1 signaling or the L2 signaling associates the second cell group with the first ID for the pTAG and the first cell group with the second ID for the sTAG.

24. The apparatus of claim 22, wherein the L1 signaling or the L2 signaling causes the second cell to serve as the SpCell and the first cell to serve as the SCell, wherein the L1 signaling or the L2 signaling indicates that the second cell group is to be associated with the first ID for the pTAG and that the first cell group is to be associated with the second ID for the sTAG.

25. The apparatus of claim 22, wherein the L1 signaling or the L2 signaling causes the second cell to serve as the SpCell and the first cell to serve as the SCell, wherein the second cell group is associated with the first ID for the pTAG and the first cell group is associated with the second ID for the sTAG based on the transmission of the L1 signaling or the L2 signaling.

26. The apparatus of claim 21, wherein a first number of cell groups in the set of cell groups is greater than a second number of available IDs for TAGs, wherein the TAG ID configuration configures a third number of IDs for the TAGs that is greater than the second number, wherein the L2 signaling comprises a medium access control (MAC) control element (MAC-CE) associated with a logical channel index (LCID), wherein a portion of the MAC-CE and the LCID indicate an ID for a TAG.

27. The apparatus of claim 21, wherein the at least one processor is further configured to:

receive data or at least one signal based on the L1 signaling or the L2 signaling.

28. The apparatus of claim 20, further comprising at least one of a transceiver or an antenna coupled to the at least one processor, wherein to transmit the L1 signaling or the L2 signaling, the at least one processor is configured to transmit the L1 signaling or the L2 signaling via at least one of the transceiver or the antenna.

29. A method of wireless communication at a user equipment (UE), comprising:

receiving a layer 1 (L1) mobility cell configuration or a layer 2 (L2) mobility cell configuration for a set of cell groups, wherein each cell group in the set of cell groups comprises a plurality of cells, wherein a first cell group in the set of cell groups is associated with a primary timing advance group (pTAG) and a second cell group in the set of cell groups is associated with a secondary timing advance group (sTAG), wherein the pTAG is associated with a first timing advance (TA) and the sTAG is associated with a second TA; and receiving L1 signaling or L2 signaling that associates the second cell group with the pTAG and the first cell group with the sTAG.

30. A method of wireless communication at a network entity, comprising:

transmitting a layer 1 (L1) mobility cell configuration or a layer 2 (L2) mobility cell configuration for a set of cell groups for a user equipment (UE), wherein each cell group in the set of cell groups comprises a plurality of cells, wherein a first cell group in the set of cell groups is associated with a primary timing advance group (pTAG) and a second cell group in the set of cell groups is associated with a secondary timing advance group (sTAG), wherein the pTAG is associated with a first timing advance (TA) and the sTAG is associated with a second TA; and transmitting L1 signaling or L2 signaling that associates the second cell group with the pTAG and the first cell group with the sTAG.

\* \* \* \* \*